(12) United States Patent
Fuso et al.

(10) Patent No.: US 7,723,409 B2
(45) Date of Patent: May 25, 2010

(54) COUPLING AGENTS BETWEEN FILLER AND ELASTOMER

(75) Inventors: Francesco Fuso, Therwil (CH); Michèle Gerster, Birsfelden (CH); Gerrit Knobloch, Magden (CH); Pierre Rota-Graziosi, Mulhouse (FR)

(73) Assignee: Ciba Specialty Chem. Corp., Tarrytown, NY (US)

( * ) Notice: Subject to any disclaimer, the term of this patent is extended or adjusted under 35 U.S.C. 154(b) by 985 days.

(21) Appl. No.: 10/581,214

(22) PCT Filed: Dec. 6, 2004

(86) PCT No.: PCT/EP2004/053273

§ 371 (c)(1),
(2), (4) Date: May 31, 2006

(87) PCT Pub. No.: WO2005/059022

PCT Pub. Date: Jun. 30, 2005

(65) Prior Publication Data

US 2008/0287578 A1    Nov. 20, 2008

(30) Foreign Application Priority Data

Dec. 15, 2003    (EP)    ................... 03104689

(51) Int. Cl.
    *C08K 5/548*    (2006.01)
    *C08K 9/06*    (2006.01)
(52) U.S. Cl. .............. 524/100; 524/262; 524/105; 556/427; 556/416; 544/69; 544/229; 548/406
(58) Field of Classification Search .............. 524/100, 524/262, 105; 556/427, 416; 544/69; 548/406
    See application file for complete search history.

(56) References Cited

U.S. PATENT DOCUMENTS

| 3,873,489 | A | 3/1975 | Thurn et al. ............ 260/33.6 |
| 4,151,157 | A | 4/1979 | Williams et al. ......... 260/42.15 |
| 6,313,205 | B1 | 11/2001 | Chiron et al. ............. 524/262 |
| 6,331,605 | B1 | 12/2001 | Lunginsland et al. ......... 528/30 |
| 6,635,700 | B2 | 10/2003 | Cruse et al. ............... 524/262 |
| 2001/0009932 | A1 | 7/2001 | Garro et al. ............... 523/152 |
| 2003/0199619 | A1 | 10/2003 | Cruse ......................... 524/261 |

FOREIGN PATENT DOCUMENTS

| EP | 0 941 872 A2 * | 9/1999 |
| EP | 0941872 | 9/1999 |
| EP | 0992535 | 4/2000 |
| EP | 1254786 | 11/2002 |
| EP | 1321488 | 6/2003 |

\* cited by examiner

*Primary Examiner*—Robert D. Harlan
(74) *Attorney, Agent, or Firm*—Tyler A. Stevenson

(57) ABSTRACT

The invention describes a composition comprising a) a naturally occurring or synthetic elastomer susceptible to oxidative, thermal, dynamic, light-induced and/or ozone-induced degradation, b) a white reinforcing filler, and c) as coupling agent, at least one compound of the formula (I) wherein the general symbols are as defined in claim 1, or an oligomeric hydrolysis product of the compound of the formula (I).

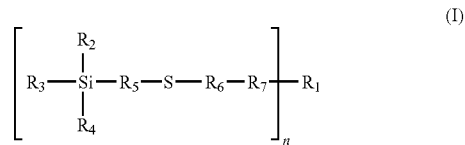

18 Claims, No Drawings

COUPLING AGENTS BETWEEN FILLER AND ELASTOMER

The present invention relates to compositions comprising an elastomer susceptible to oxidative, thermal, dynamic, light- and/or ozone-induced degradation, a white reinforcing filler, and as coupling agent at least a thio substituted silane or an oligomeric hydrolysis product thereof; to new coupling agents; and to a process for ensuring the coupling of a white reinforcing filler to elastomer compositions reinforced by a white filler, which comprises incorporating into the elastomer at least a thio substituted silane or an oligomeric hydrolysis product thereof and vulcanizing the composition.

For the reinforcing of elastomers with for example silica fillers a coupling agent is preferably added. A widely used coupling agent for this purpose is bis-triethoxysilylpropyl-tetrasulfane (TESPT; or Si 69 from Degussa) as disclosed for example in U.S. Pat. No. 3,873,489.

U.S. Pat. No. 6,313,205 disclosed a sulfur-vulcanizable rubber composition comprising at least one diene elastomer, a white reinforcing filler, and a coupling agent selected from the group of polyorganosiloxanes.

U.S.-A-2003/0199619 discloses blocked mercaptosilane condensates as coupling agents in mineral filled elastomer compositions. Among the advantages in the use of these blocked mercaptosilane condensates over the use of previously described blocked mercaptosilanes are the release of less volative organic compounds during the elastomer compounding process and lower coupling agent loading requirements.

The known coupling agents for mineral filled elastomers do not satisfy in every respect the high requirements which a coupling agent is required to meet, especially with regard to the final mechanical properties of the elastomer such as for example elongation an break, modulus, compression set and heat buildup. Furthermore, good processing safety during the mixing of the elastomer with the filler and the coupling agent is also highly sought.

It has now been found that a specific group of thio substituted silanes or oligomeric hydrolysis products thereof are particularly suitable as coupling agents for ensuring the coupling of a white reinforcing filler with an elastomer.

The present invention therefore provides compositions comprising a) a naturally occurring or synthetic elastomer susceptible to oxidative, thermal, dynamic, light-induced and/or ozone-induced degradation,
b) a white reinforcing filler, and
c) as coupling agent, at least one compound of the formula I

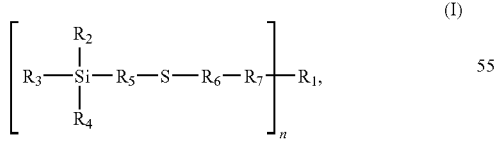

wherein, when n is 1, $R_1$ is hydrogen, $C_1$-$C_{25}$alkyl, $C_1$-$C_{25}$alkyl substituted with furyl, morpholine, $C_1$-$C_4$dialkylamino, $C_1$-$C_4$-trialkylammonium or $M^{+-}O_3S$—; $C_2$-$C_{25}$alkyl interrupted by oxygen; $C_5$-$C_{12}$cycloalkyl, $C_2$-$C_{25}$alkenyl, unsubstituted or $C_1$-$C_4$alkyl-substituted phenyl; $C_7$-$C_{12}$-phenoxyalkyl, unsubstituted or $C_1$-$C_4$alkyl substituted $C_7$-$C_9$bicycloalkyl;

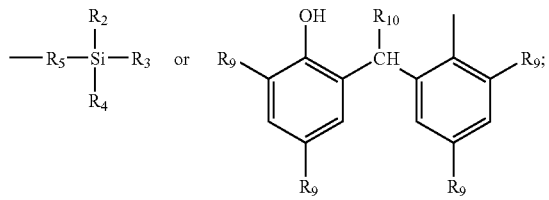

or when $R_7$ is a direct bond, $R_1$ is —CN, —$SOR_8$, —$SO_2R_8$, —$NO_2$ or —$COR_8$, when n is 2, $R_1$ is $C_1$-$C_{25}$alkylene, $C_1$-$C_{25}$alkylene substituted with $C_1$-$C_4$alkyl; $C_2$-$C_{25}$alkylene substituted with $C_1$-$C_4$alkyl and interrupted by oxygen; $C_2$-$C_{25}$alkylene interrupted by oxygen, sulfur, phenylene or cyclohexylene;

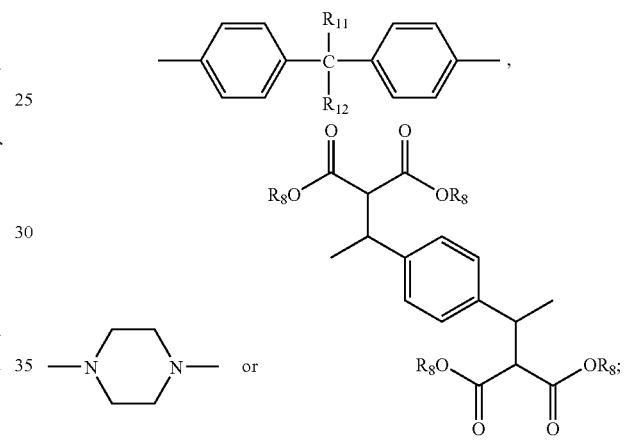

or when $R_6$ and $R_7$ are a direct bond, $R_1$ is

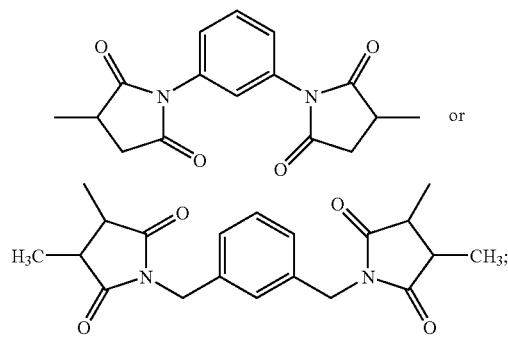

$R_2$, $R_3$ and $R_4$ are each independently of the others $C_1$-$C_{25}$alkyl, $C_2$-$C_{25}$alkyl interrupted by oxygen; $C_5$-$C_{12}$cycloalkyl, $C_2$-$C_{25}$alkenyl, unsubstituted or $C_1$-$C_4$alkyl-substituted phenyl, $C_7$-$C_9$phenylalkyl, $C_1$-$C_{25}$alkoxy, $C_3$-$C_{25}$alkoxy interrupted by oxygen; $C_5$-$C_{12}$cycloalkoxy, $C_2$-$C_{25}$alkenyloxy, unsubstituted or $C_1$-$C_4$alkyl-substituted phenoxy, $C_7$-$C_9$phenylalkoxy, halogen, $C_2$-$C_{25}$alkanoyloxy or unsubstituted or $C_1$-$C_4$alkyl substituted benzoyloxy; with the proviso that at least one of $R_2$, $R_3$ or $R_4$ is $C_1$-$C_{25}$alkoxy, $C_3$-$C_{25}$alkoxy interrupted by oxygen;

$C_5$-$C_{12}$cycloalkoxy, $C_2$-$C_{25}$alkenyloxy, unsubstituted or $C_1$-$C_4$alkyl-substituted phenoxy, $C_7$-$C_9$phenylalkoxy, halogen, $C_2$-$C_{25}$alkanoyloxy or unsubstituted or $C_1$-$C_4$alkyl substituted benzoyloxy;

$R_5$ is $C_1$-$C_{25}$alkylene, $C_5$-$C_{12}$cycloalkylene, unsubstituted or $C_1$-$C_4$alkyl substituted phenylene;

$R_6$ is a direct bond, $C_1$-$C_{25}$alkylene; $C_1$-$C_{25}$alkylene substituted with $C_1$-$C_{25}$alkyl, $C_2$-$C_{25}$alkoxycarbonyl or phenyl;

$R_7$ is a direct bond or

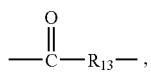

with the proviso that, when $R_7$ is a direct bond and n is 1, $R_6$ is not a direct bond; and with the proviso that, when $R_7$ is

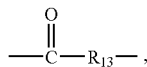

$R_6$ is not a direct bond;

$R_8$ is $C_1$-$C_{25}$alkyl, $C_2$-$C_{25}$alkyl interrupted by oxygen; $C_5$-$C_{12}$cycloalkyl, $C_2$-$C_{25}$alkenyl, $C_2$-$C_{25}$alkinyl, $C_7$-$C_9$phenylalkyl, unsubstituted or $C_1$-$C_4$alkyl-substituted phenyl, $R_9$ is $C_1$-$C_5$alkyl, $R_{10}$ is hydrogen or $C_1$-$C_4$alkyl, $R_{11}$ and $R_{12}$ are each independently of the other hydrogen, $CF_3$, $C_1$-$C_{12}$alkyl or phenyl, or $R_{11}$ and $R_{12}$, together with the carbon atom to which they are bonded, form a $C_5$-$C_8$cycloalkylidene ring that is unsubstituted or substituted by from 1 to 3 $C_1$-$C_4$alkyl groups, $R_{13}$ is oxygen or —N($R_{14}$)—, $R_{14}$ is hydrogen or $C_1$-$C_{12}$alkyl, M is sodium, potassium or ammonium, and n is 1 or 2; or an oligomeric hydrolysis product of the compound of the formula I.

Oligomeric hydrolysis products of the compounds of the formula I are those in which at least one of the radicals at the silicium atom ($R_2$, $R_3$ or $R_4$) is replaced by an OH group.

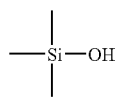

groups can then easily condensate with, for example, another

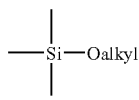

group to form oligomeric compounds. Such condensates or oligomeric hydrolysis products are therefore for example

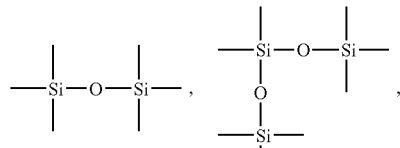

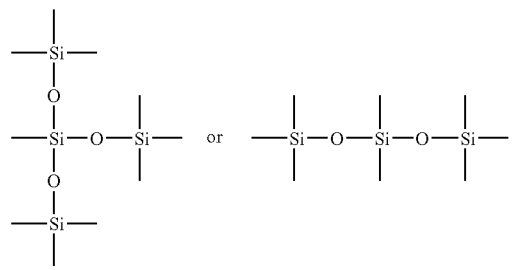

Alkyl having up to 25 carbon atoms is a branched or unbranched radical, such as methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl or eicosyl.

$C_1$-$C_{25}$Alkyl substituted with furyl, morpholine, $C_1$-$C_4$dialkylamino, $C_1$-$C_4$-trialkylammonium or $M^{+-}O_3S$— is a branched or unbranched radical, such as furylmethyl, furylethyl, furylpropyl, 2,4-difuryl-hexyl, N-morpholinylethyl, N-morpholinylbutyl, N-morphlinylhexyl, 3-dimethylaminopropyl, 4-dimethylaminobutyl, 5-dimethylaminopentyl, 6-diethylaminohexyl, trimethylammoniumpropyl or potassium sulfoxylpropyl.

$C_2$-$C_{18}$Alkyl interrupted by oxygen is, for example, $CH_3$—O—$CH_2CH_2$—, $CH_3$—O—$CH_2CH_2$—O—$CH_2CH_2$—, $CH_3$—(O—$CH_2CH_2$—$)_2$O—$CH_2CH_2$—, $CH_3$—(O—$CH_2CH_2$—$)_3$O—$CH_2CH_2$— or $CH_3$—(O—$CH_2CH_2$—$)_4$O—$CH_2CH_2$—.

Alkenyl having 2 to 25 carbon atoms is a branched or unbranched radical such as, for example, vinyl, propenyl, 2-butenyl, 3-butenyl, isobutenyl, n-2,4-pentadienyl, 3-methyl-2-butenyl, n-2-octenyl, n-2-dodecenyl, iso-dodecenyl, oleyl, n-2-octadecenyl or n-4-octadecenyl.

$C_1$-$C_4$Alkyl-substituted phenyl, which contains preferably from 1 to 3, especially 1 or 2, alkyl groups, is, for example, o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 4-tert-butylphenyl, 2-ethylphenyl or 2,6-diethylphenyl.

$C_7$-$C_{12}$-Phenoxyalkyl is, for example, phenoxymethyl, phenoxyethyl, phenoxypropyl, phenoxybutyl, phenoxypentyl, or phenoxyhexyl.

$C_7$-$C_8$Bicycloalkylene is, for example, bicycloheptylene or bicyclooctylene $C_1$-$C_4$Alkyl substituted $C_7$-$C_9$bicycloalkyl is,

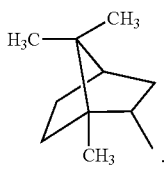

$C_1$-$C_{25}$Alkylene or $C_1$-$C_{25}$alkylene substituted with $C_1$-$C_4$alkyl containing preferably from 1 to 3, especially 1 or 2, branched or unbranched alkyl group radicals, is a branched or unbranched radical, for example methylene, ethylene, propylene, trimethylene, tetramethylene, pentamethylene, hexamethylene, heptamethylene, octamethylene, decamethylene, dodecamethylene, octadecamethylene, 1-methylethylene or 2-methylethylene.

$C_2$-$C_{25}$Alkylene substituted with $C_1$-$C_4$alkyl and interrupted by oxygen is, for example, —$CH_2CH_2$—O—$CH_2C(CH_3)_2CH_2$—O—$CH_2CH_2$—.

$C_2$-$C_{25}$Alkylene interrupted by oxygen, sulfur, phenylene or cyclohexylene is, for example, —$CH_2$—O—$CH_2$—, —$CH_2CH_2$—O—$CH_2CH_2$—, —$CH_2CH_2$—S—$CH_2CH_2$—, —$CH_2$—O—$CH_2CH_2$—O—$CH_2$—, —$CH_2CH_2$—O—$CH_2CH_2$—O—$CH_2CH_2$—, —$CH_2$—(O—$CH_2CH_2$—)$_2$O—$CH_2$—, —$CH_2CH_2$—(O—$CH_2CH_2$—)$_2$O—$CH_2CH_2$—, —$CH_2$—(O—$CH_2CH_2$—)$_3$O—$CH_2$—, —$CH_2$—(O—$CH_2CH_2$—)$_4$O—$CH_2$—, —$CH_2CH_2$—(O—$CH_2CH_2$—)$_4$O—$CH_2CH_2$—, —$CH_2CH_2$—O—$CH_2C(CH_3)_2CH_2$—O—$CH_2CH_2$—

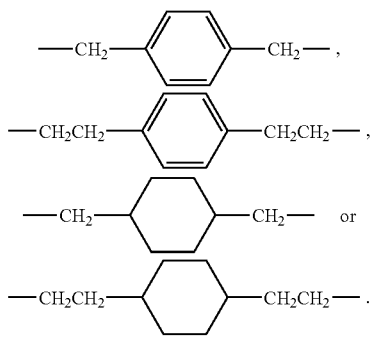

$C_5$-$C_{12}$Cycloalkyl is, for example, cyclopentyl, cyclohexyl, cycloheptyl or cyclooctyl. Preference is given to cyclohexyl.

$C_7$-$C_9$Phenylalkyl is, for example, benzyl, α-methylbenzyl, α,α-dimethylbenzyl or 2-phenylethyl.

Alkoxy containing up to 25 carbon atoms is a branched or unbranched radical, for example methoxy, ethoxy, propoxy, isopropoxy, n-butoxy, isobutoxy, pentyloxy, isopentyloxy, hexyloxy, heptyloxy, octyloxy, decyloxy, tetradecyloxy, hexadecyloxy or octadecyloxy.

$C_3$-$C_{25}$Alkoxy interrupted by oxygen is, for example, $CH_3$—O—$CH_2CH_2O$—, $CH_3$—O—$CH_2CH_2$—O—$CH_2CH_2O$—, $CH_3$—(O—$CH_2CH_2$—)$_2$O—$CH_2CH_2O$—, $CH_3$—(O—$CH_2CH_2$—)$_3$O—$CH_2CH_2O$— or $CH_3$—(O—$CH_2CH_2$—)$_4$O—$CH_2CH_2O$—.

$C_5$-$C_{12}$Cycloalkoxy is, for example, cyclopentyloxy, cyclohexyloxy, cycloheptyloxy, cyclooctyloxy, cyclononyloxy, cyclodecyloxy, cycloundecyloxy or cyclododecyloxy. Preference is given to cyclohexyloxy.

Alkenyloxy containing from 2 to 25 carbon atoms is a branched or unbranched radical, for example vinyloxy, propenyloxy, 2-butenyloxy, 3-butenyloxy, isobutenyloxy, n-2,4-pentadienyloxy, 3-methyl-2-butenyloxy, n-2-octenyloxy, n-2-dodecenyloxy, isododecenyloxy, oleyloxy, n-2-octadecenyloxy or n-4-octadecenyloxy.

$C_1$-$C_4$Alkyl-substituted phenoxy, which contains preferably from 1 to 3, especially 1 or 2, alkyl groups, is, for example, o-, m- or p-methylphenoxy, 2,3-dimethylphenoxy, 2,4-dimethylphenoxy, 2,5-dimethylphenoxy, 2,6-dimethylphenoxy, 3,4-dimethylphenoxy, 3,5-dimethylphenoxy, 2-methyl-6-ethylphenoxy, 4-tert-butylphenoxy, 2-ethylphenoxy or 2,6-diethylphenoxy.

$C_7$-$C_9$Phenylalkoxy is, for example, benzyloxy, α-methylbenzyloxy, α,α-dimethylbenzyloxy or 2-phenylethoxy.

Halogen is, for example, chlorine, bromine or iodine. Preference is given to chlorine.

Alkanoyloxy containing from 2 to 25 carbon atoms is a branched or unbranched radical, for example acetoxy, propionyloxy, butanoyloxy, pentanoyloxy, hexanoyloxy, heptanoyloxy, octanoyloxy, nonanoyloxy, decanoyloxy, undecanoyloxy, dodecanoyloxy, tridecanoyloxy, tetradecanoyloxy, pentadecanoyloxy, hexadecanoyloxy, heptadecanoyloxy, octadecanoyloxy, eicosanoyloxy or docosanoyloxy.

$C_1$-$C_4$Alkyl substituted benzoyloxy which contains preferably from 1 to 3, especially 1 or 2, alkyl groups, is, for example, o-, m- or p-methylbenzoyloxy, 2,3-dimethylbenzoyloxy, 2,4-dimethylbenzoyloxy, 2,5-dimethylbenzoyloxy, 2,6-dimethylbenzoyloxy, 3,4-dimethylbenzoyloxy, 3,5-dimethylbenzoyloxy, 2-methyl-6-ethylbenzoyloxy, 4-tertbutylbenzoyloxy, 2-ethylbenzoyloxy or 2,6-diethylbenzoyloxy.

$C_1$-$C_4$Alkyl substituted phenylene which contains preferably from 1 to 3, especially 1 or 2, alkyl groups, is, for example, 2-methylphenylene, 2-ethylphenylene, 2-propylphenylene, 2-butylenephenylene, 2,6-dimethylphenylene, 2,5-dimethylphenylene or 2,3-dimethylphenylene.

$C_1$-$C_{25}$Alkylene substituted with $C_1$-$C_{25}$alkyl, $C_2$-$C_{25}$alkoxycarbonyl or phenyl is a branched or unbranched radical, for example —$CH_2(COOCH_3)$—, —$CH_2(COOCH_2CH_3)$—, 2-methylethylene or 2-phenylethylene.

Alkinyl having 2 to 25 carbon atoms is a branched or unbranched radical such as, for example, acetylyl, propargyl, 2-butinyl, 3-butinyl, isobutinyl, n-2,4-pentadiinyl, 3-methyl-2-butinyl, n-2-octinyl, n-2-dodecinyl, iso-dodecinyl, n-2-octadecinyl or n-4-octadecinyl.

$C_5$-$C_{12}$cycloalkylene is for example cyclopentylene, cyclohexylene, cycloheptylene, cyclooctylene, cyclononylene, cyclodecylene, cycloundecylene or cyclododecylene. Cyclohexylene is preferred.

A $C_5$-$C_8$cycloalkylidene ring substituted by $C_1$-$C_4$alkyl, which contains preferably from 1 to 3, especially 1 or 2, branched or unbranched alkyl group radicals, is, for example, cyclopentylidene, methylcyclopentylidene, dimethylcyclopentylidene, cyclohexylidene, methylcyclohexylidene, dimethylcyclohexylidene, trimethylcyclohexylidene, tertbutylcyclohexylidene, cycloheptylidene or cyclooctylidene. Preference is given to cyclohexylidene and tert-butylcyclohexylidene.

Interesting compositions comprise, as component 1, at least one compound of the formula I wherein when n is 1, $R_1$ is hydrogen, $C_1$-$C_{18}$alkyl, $C_1$-$C_{18}$alkyl substituted with furyl, morpholine, $C_1$-$C_4$dialkylamino, $C_1$-$C_4$-trialkylammonium or $M^{+-}O_3S$—; $C_2$-$C_{18}$alkyl interrupted by oxygen; $C_5$-$C_8$cycloalkyl, $C_2$-$C_{16}$alkenyl, unsubstituted or $C_1$-$C_4$alkyl-substituted phenyl; $C_7$-$C_{10}$-phenoxyalkyl, unsubstituted or $C_1$-$C_4$alkyl substituted $C_7$-$C_9$bicycloalkyl;

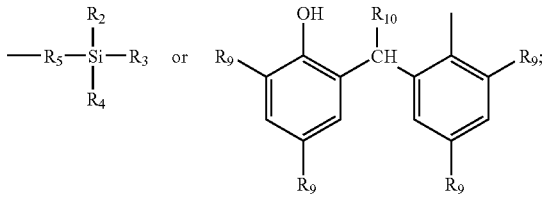

or when $R_7$ is a direct bond, $R_1$ is —CN, —$SOR_8$, —$SO_2R_8$, —$NO_2$ or —$COR_8$, when n is 2, $R_1$ is $C_1$-$C_{18}$alkylene, $C_1$-$C_{18}$alkylene substituted with $C_1$-$C_4$alkyl; $C_2$-$C_{18}$alkylene substituted with $C_1$-$C_4$alkyl and interrupted by oxygen; $C_2$-$C_{18}$alkylene interrupted by oxygen, sulfur, phenylene or cyclohexylene;

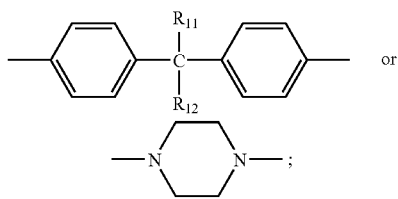

or when $R_6$ and $R_7$ are a direct bond, $R_1$ is

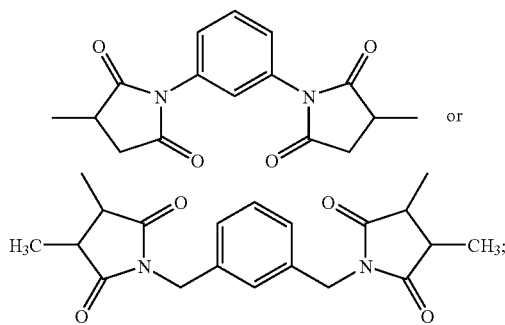

$R_2$, $R_3$ and $R_4$ are each independently of the others $C_1$-$C_{18}$alkyl, $C_2$-$C_{18}$alkyl interrupted by oxygen; $C_5$-$C_8$cycloalkyl, $C_2$-$C_{18}$alkenyl, unsubstituted or $C_1$-$C_4$alkyl-substituted phenyl, $C_7$-$C_9$phenylalkyl, $C_1$-$C_{18}$alkoxy, $C_3$-$C_{18}$alkoxy interrupted by oxygen; $C_5$-$C_8$cycloalkoxy, $C_2$-$C_{18}$alkenyloxy, unsubstituted or $C_1$-$C_4$alkyl-substituted phenoxy, $C_7$-$C_9$phenylalkoxy, halogen, $C_2$-$C_{18}$alkanoyloxy or unsubstituted or $C_1$-$C_4$alkyl substituted benzoyloxy; with the proviso that at least one of $R_2$, $R_3$ or $R_4$ is $C_1$-$C_{18}$alkoxy, $C_3$-$C_{18}$alkoxy interrupted by oxygen; $C_5$-$C_8$cycloalkoxy, $C_2$-$C_{18}$alkenyloxy, unsubstituted or $C_1$-$C_4$alkyl-substituted phenoxy, $C_7$-$C_9$phenylalkoxy, halogen, $C_2$-$C_{18}$alkanoyloxy or unsubstituted or $C_1$-$C_4$alkyl substituted benzoyloxy;

$R_5$ is $C_1$-$C_{18}$alkylene, $C_5$-$C_8$cycloalkylene, unsubstituted or $C_1$-$C_4$alkyl substituted phenylene;

$R_6$ is a direct bond, $C_1$-$C_{18}$alkylene; or $C_1$-$C_{18}$alkylene substituted with $C_1$-$C_{18}$alkyl, $C_2$-$C_{18}$alkoxycarbonyl or phenyl;

$R_7$ is a direct bond or

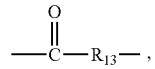

with the proviso that, when $R_7$ is a direct bond and n is 1, $R_6$ is not a direct bond; and with the proviso that, when $R_7$ is

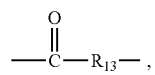

$R_6$ is not a direct bond;

$R_8$ is $C_1$-$C_{18}$alkyl, $C_2$-$C_{18}$alkyl interrupted by oxygen; $C_5$-$C_8$cycloalkyl, $C_2$-$C_{18}$alkenyl, $C_2$-$C_{18}$alkinyl, $C_7$-$C_9$phenylalkyl, unsubstituted or $C_1$-$C_4$alkyl-substituted phenyl, $R_9$ is $C_1$-$C_9$alkyl, $R_{10}$ is hydrogen or methyl, $R_{11}$ and $R_{12}$ are each independently of the other hydrogen, $CF_3$, $C_1$-$C_8$alkyl or phenyl, or $R_{11}$ and $R_{12}$, together with the carbon atom to which they are bonded, form a $C_6$-$C_8$cycloalkylidene ring that is unsubstituted or substituted by from 1 to 3 $C_1$-$C_4$alkyl groups, $R_{13}$ is oxygen or —$N(R_{14})$—, $R_{14}$ is hydrogen or $C_1$-$C_8$alkyl, M is sodium, potassium or ammonium, and n is 1 or 2.

Preferred compositions comprise, as component (c), at least one compound of the formula I wherein $R_2$, $R_3$ and $R_4$ are each independently of the others $C_1$-$C_4$alkyl or $C_1$-$C_4$alkoxy; with the proviso that at least one of $R_2$, $R_3$ or $R_4$ is $C_1$-$C_4$alkoxy.

Preference is also given to compositions comprising, as component (c), at least one compound of the formula I wherein $R_6$ is $C_2$-$C_4$alkylene.

Particular preference is given to compositions comprising, as component (c), at least one compound of the formula I wherein when n is 1, $R_1$ is hydrogen, $C_1$-$C_{18}$alkyl, $C_1$-$C_{12}$alkyl substituted with furyl, morpholine, $C_1$-$C_4$dialkylamino, $C_1$-$C_4$-trialkylammonium or $M^{+-}O_3S$—; $C_2$-$C_{12}$alkyl interrupted by oxygen; cyclohexyl, $C_4$-$C_{12}$-alkenyl, phenyl, $C_7$-$C_{10}$phenoxyalkyl, unsubstituted or $C_1$-$C_4$alkyl substituted $C_7$-$C_9$bicycloalkyl;

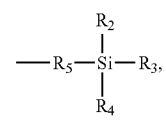

or when $R_7$ is a direct bond, $R_1$ is —CN, —$SOR_8$ or —$SO_2R_8$;

when n is 2, $R_1$ is $C_2$-$C_{12}$alkylene, $C_2$-$C_{12}$alkylene substituted with methyl; $C_2$-$C_{12}$alkylene substituted with methyl and interrupted by oxygen; $C_4$-$C_{12}$alkylene interrupted by oxygen, sulfur, phenylene or cyclohexylene;

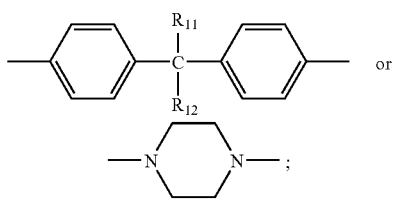

or when $R_6$ and $R_7$ are a direct bond, $R_1$ is

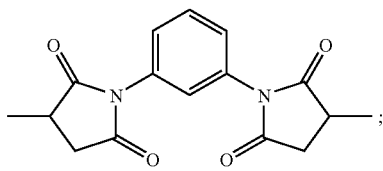

$R_2$, $R_3$ and $R_4$ are each independently of the others $C_1$-$C_8$alkyl, $C_4$-$C_8$alkyl interrupted by oxygen; cyclohexyl, $C_2$-$C_{12}$alkenyl, benzyl, $C_1$-$C_8$alkoxy, $C_3$-$C_8$alkoxy interrupted by oxygen; cyclohexyloxy, $C_2$-$C_{12}$alkenyloxy, phenoxy, benzyloxy, chloro, bromo, $C_2$-$C_8$alkanoyloxy or benzoyloxy; with the proviso that at least one of $R_2$, $R_3$ or $R_4$ is $C_1$-$C_8$alkoxy, $C_3$-$C_8$alkoxy interrupted by oxygen; cyclohexyloxy, $C_2$-$C_{12}$alkenyloxy, phenoxy, benzyloxy, chloro, bromo, $C_2$-$C_8$alkanoyloxy or benzoyloxy;

$R_5$ is $C_2$-$C_8$alkylene, cyclohexylene or phenylene;

$R_6$ is a direct bond, $C_1$-$C_8$alkylene; or $C_1$-$C_8$alkylene substituted with $C_1$-$C_4$alkyl, $C_2$-$C_8$alkoxycarbonyl or phenyl;

$R_7$ is a direct bond or

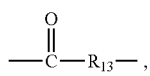

with the proviso that, when $R_7$ is a direct bond and n is 1, $R_6$ is not a direct bond; and with the proviso that, when $R_7$ is

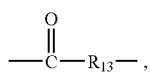

$R_6$ is not a direct bond;

$R_8$ is $C_1$-$C_{12}$alkyl, $C_2$-$C_{12}$alkyl interrupted by oxygen; cyclohexyl, $C_2$-$C_{12}$alkenyl, $C_2$-$C_{12}$alkinyl, benzyl or phenyl, $R_{11}$ and $R_{12}$ are each independently of the other hydrogen or $C_1$-$C_8$alkyl, or $R_{11}$ and $R_{12}$, together with the carbon atom to which they are bonded, form a cyclohexylidene ring that is unsubstituted or substituted by from 1 to 3 methyl groups, $R_{13}$ is oxygen or —N($R_{14}$)—, $R_{14}$ is hydrogen or $C_1$-$C_4$alkyl, M is sodium or potassium, and n is 1 or 2.

Of interest are compositions comprising, as component (c), at least one compound of the formula I wherein when n is 1, $R_1$ is hydrogen, $C_1$-$C_{18}$alkyl, $C_1$-$C_8$alkyl substituted with furyl, morpholine, $C_1$-$C_4$dialkylamino, $C_1$-$C_4$trialkylammonium or $M^+$-$O_3S$—; $C_2$-$C_8$alkyl interrupted by oxygen; cyclohexyl, $C_4$-$C_{10}$-alkenyl, phenyl, $C_7$-$C_{10}$phenoxyalkyl, unsubstituted or $C_1$-$C_4$alkyl substituted $C_7$-$C_9$bicycloalkyl;

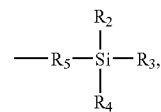

or when $R_7$ is a direct bond, $R_1$ is —CN, —$SOR_8$ or —$SO_2R_8$;

when n is 2, $R_1$ is $C_2$-$C_8$alkylene, $C_2$-$C_8$alkylene substituted with methyl; $C_2$-$C_{10}$alkylene substituted with methyl and interrupted by oxygen; $C_4$-$C_{12}$alkylene interrupted by oxygen or sulfur;

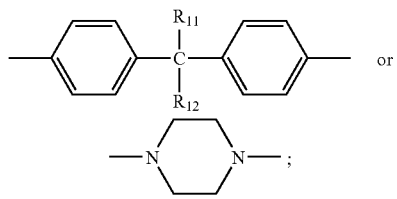

or when $R_6$ and $R_7$ are a direct bond, $R_1$ is

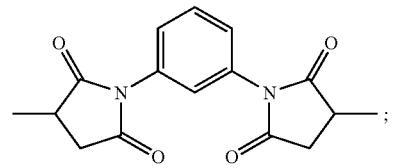

$R_2$, $R_3$ and $R_4$ are each independently of the others $C_1$-$C_4$alkyl, cyclohexyl, $C_2$-$C_6$alkenyl, benzyl, $C_1$-$C_4$alkoxy, cyclohexyloxy, $C_2$-$C_6$alkenyloxy, phenoxy, benzyloxy, chloro, $C_2$-$C_4$alkanoyloxy or benzoyloxy; with the proviso that at least one of $R_2$, $R_3$ or $R_4$ is $C_1$-$C_4$alkoxy, cyclohexyloxy, $C_2$-$C_6$alkenyloxy, phenoxy, benzyloxy, chloro, $C_2$-$C_4$alkanoyloxy or benzoyloxy;

$R_5$ is $C_2$-$C_6$alkylene or cyclohexylene, $R_6$ is a direct bond, $C_1$-$C_6$alkylene; or $C_1$-$C_6$alkylene substituted with methyl, $C_2$-$C_6$alkoxycarbonyl or phenyl;

$R_7$ is a direct bond or

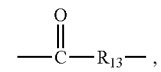

with the proviso that, when $R_7$ is a direct bond and n is 1, $R_6$ is not a direct bond; and with the proviso that, when $R_7$ is

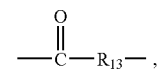

$R_6$ is not a direct bond;

$R_8$ is $C_1$-$C_8$alkyl or $C_2$-$C_{12}$alkenyl, $R_{11}$ and $R_{12}$ are each independently of the other hydrogen or $C_1$-$C_6$alkyl, $R_{13}$ is oxygen or $-N(R_{14})-$,
$R_{14}$ is hydrogen or methyl,
M is sodium or potassium, and
n is 1 or 2.

Also of interest are compositions comprising, as component (c), at least one compound of the formula I wherein when n is 1, $R_1$ is hydrogen, $C_1$-$C_{18}$alkyl, $C_1$-$C_4$alkyl substituted with furyl, morpholine, $C_1$-$C_4$dialkylamino, $C_1$-$C_4$-trialkylammonium or $M^{+-}O_3S-$; $C_2$-$C_6$alkyl interrupted by oxygen; cyclohexyl, $C_4$-$C_{10}$alkenyl, phenyl; $C_7$-$C_9$phenoxyalkyl, unsubstituted or $C_1$-$C_4$alkyl substituted $C_7$-$C_9$bicycloalkyl;

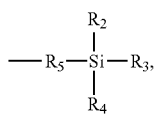

or when $R_7$ is a direct bond, $R_1$ is $-CN$;

when n is 2, $R_1$ is $C_2$-$C_6$alkylene, $C_2$-$C_4$alkylene substituted with methyl; $C_4$-$C_8$alkylene substituted with methyl and interrupted by oxygen; $C_4$-$C_8$alkylene interrupted by oxygen;

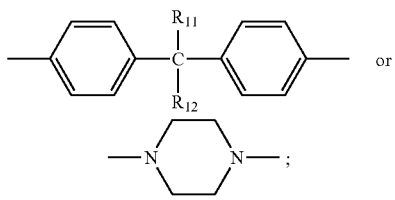

or when $R_6$ and $R_7$ are a direct bond, $R_1$ is

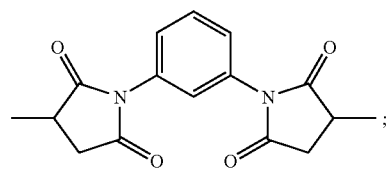

$R_2$, $R_3$ and $R_4$ are each independently of the others $C_1$-$C_4$alkyl or $C_1$-$C_4$alkoxy; with the proviso that at least one of $R_2$, $R_3$ or $R_4$ is $C_1$-$C_4$alkoxy;
$R_5$ is $C_2$-$C_4$alkylene,
$R_6$ is a direct bond, $C_1$-$C_3$alkylene; or $C_1$-$C_3$alkylene substituted with methyl, $C_2$-$C_3$alkoxycarbonyl or phenyl;
$R_7$ is a direct bond or

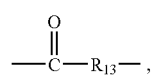

with the proviso that, when $R_7$ is a direct bond and n is 1, $R_6$ is not a direct bond; and with the proviso that, when $R_7$ is

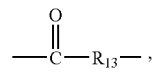

$R_6$ is not a direct bond;
$R_{11}$ and $R_{12}$ are each independently of the other hydrogen or $C_1$-$C_4$alkyl,
$R_{13}$ is oxygen or $-N(R_{14})-$,
$R_{14}$ is hydrogen,
M is potassium, and
n is 1 or 2; or an oligomeric hydrolysis product of the compound of the formula Ia.

Of very special interest are compositions comprising, as component (c), the compounds 101 to 159.

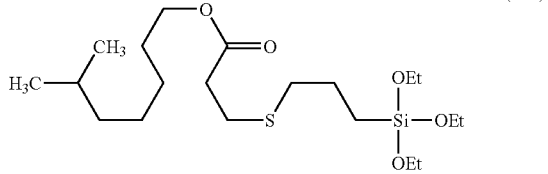
(101)

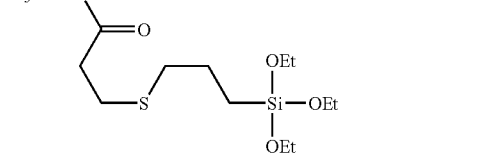
(102)

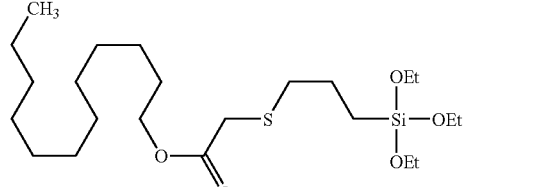
(103)

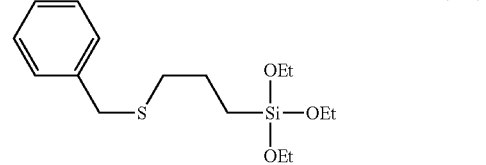
(104)

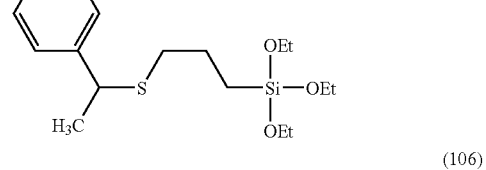
(105)

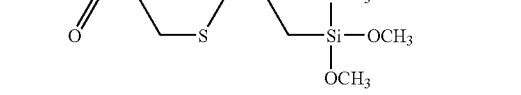
(106)

-continued
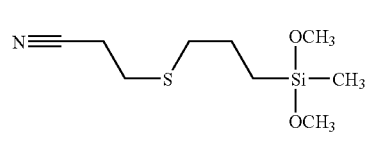 (107)
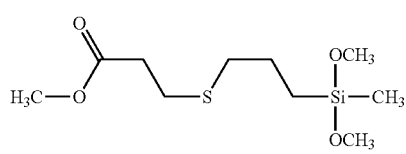 (108)
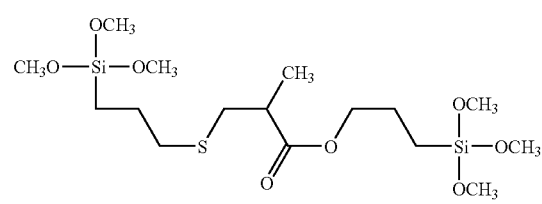 (109)
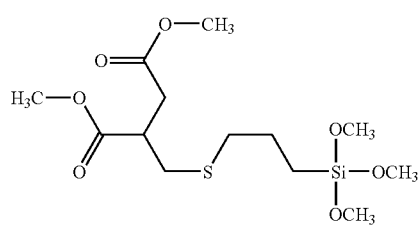 (110)
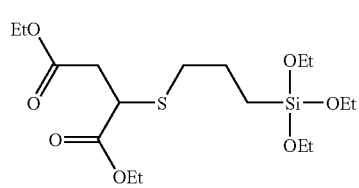 (111)
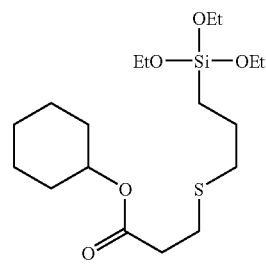 (112)
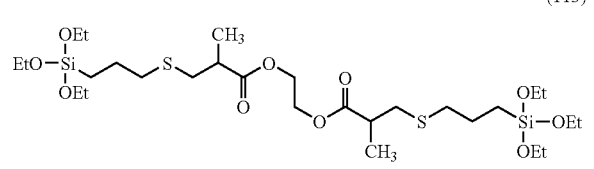 (113)
-continued
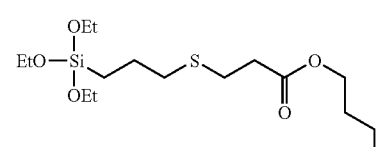 (114)
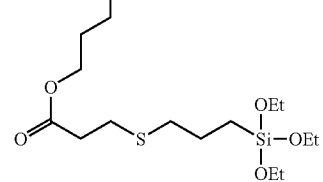 (115)
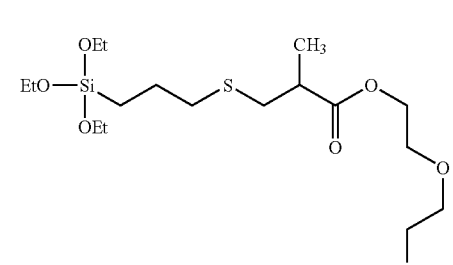 (116)
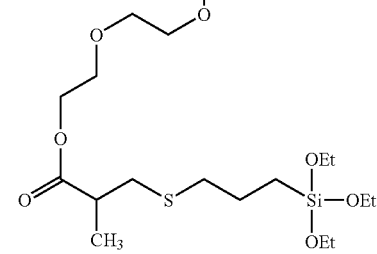 (117)
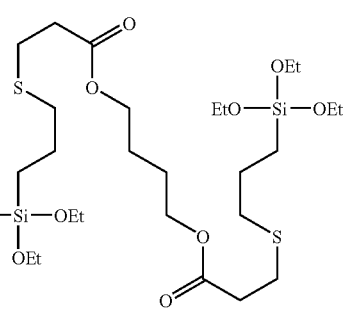
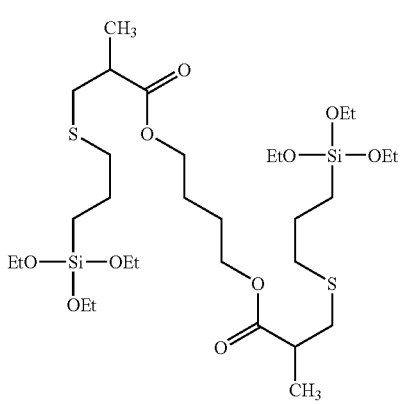

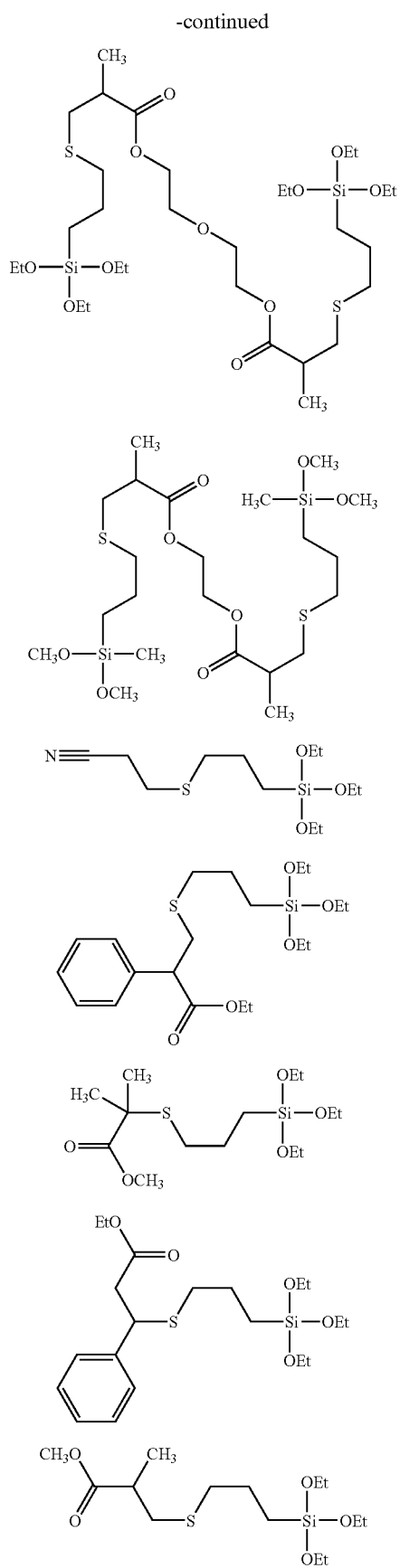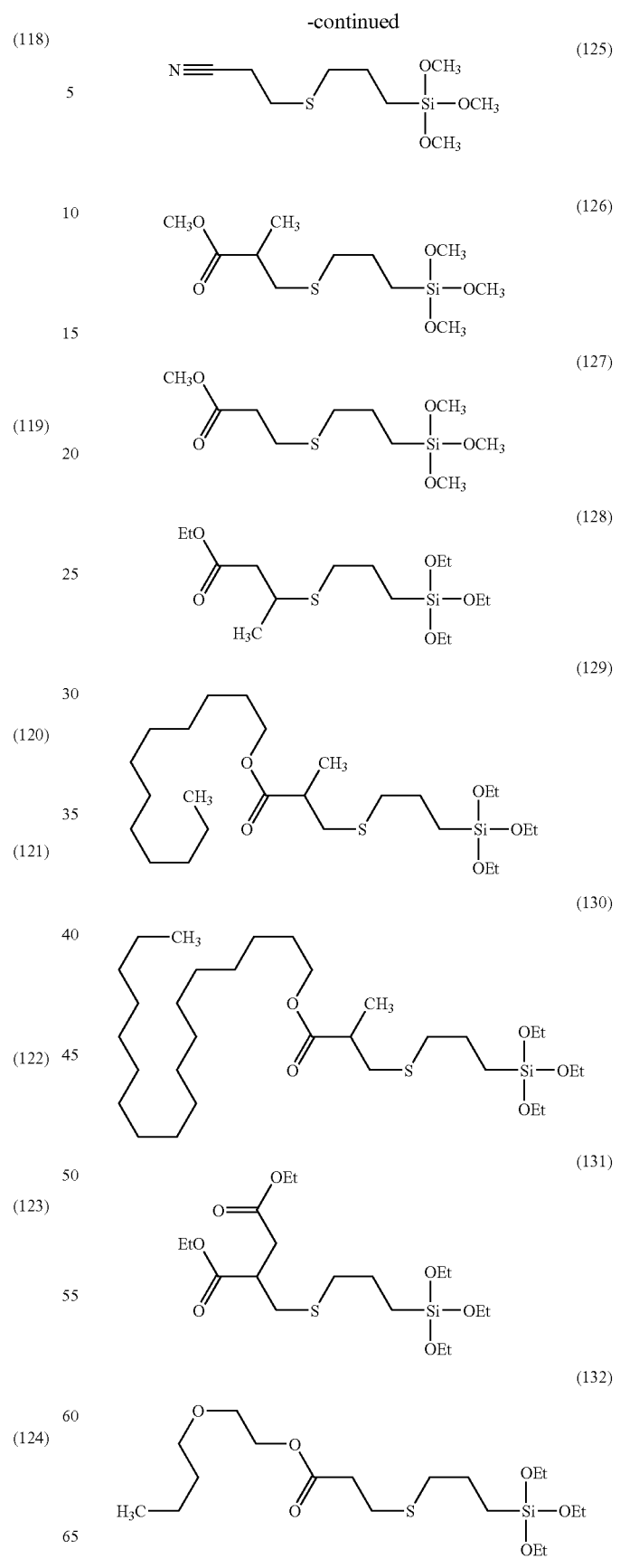

(133) 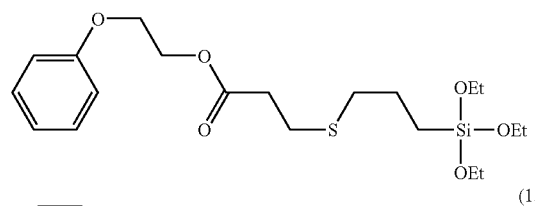
(134) 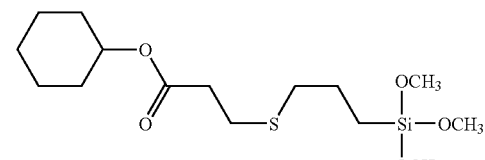
(135) 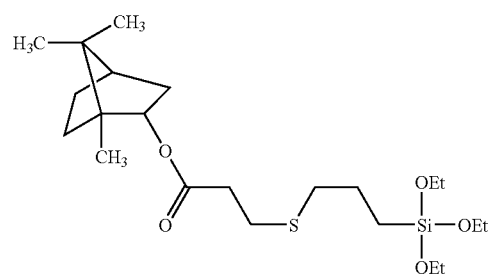
(136) 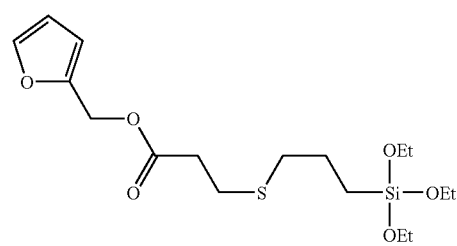
(137) 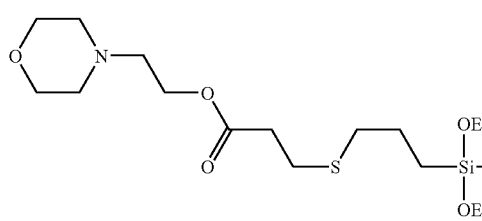
(138) 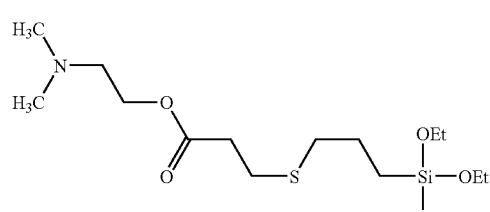
(139) 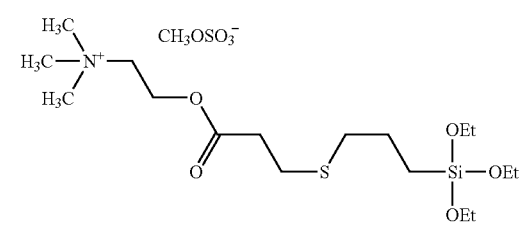
(140) 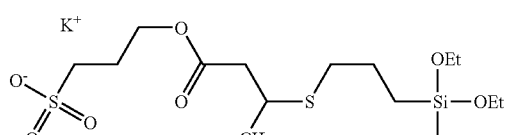
(141) 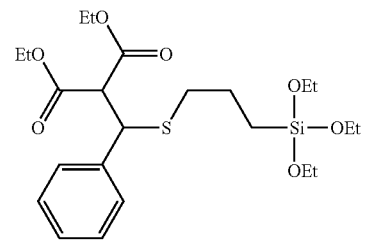
(142) 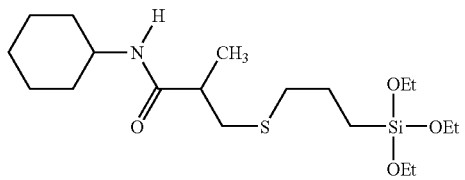
(143) 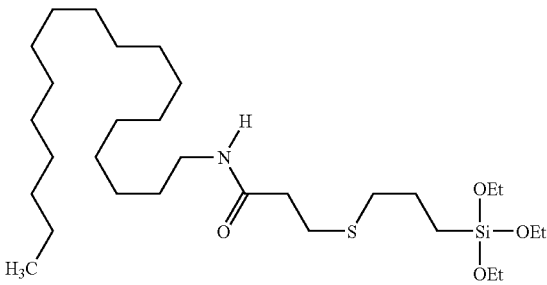
(144) 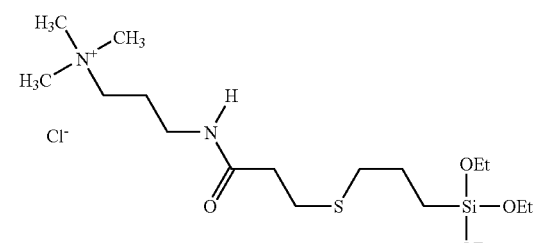
(145) 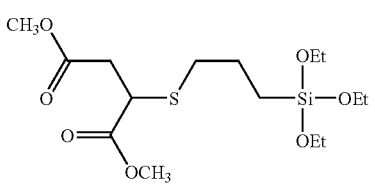
(146)

(147) 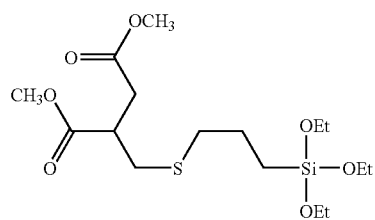
(148) 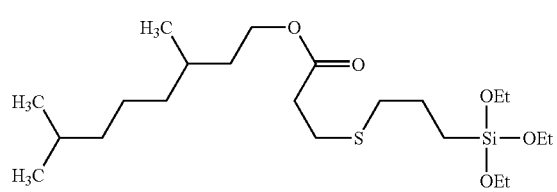
(149) 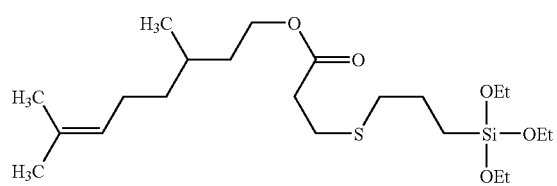
(150) 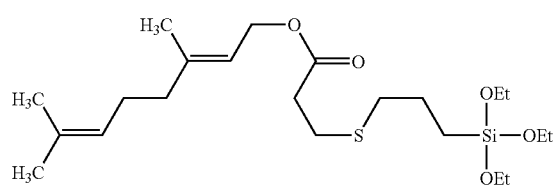
(151) 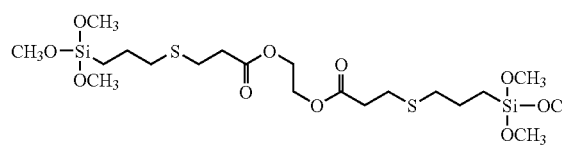
(152) 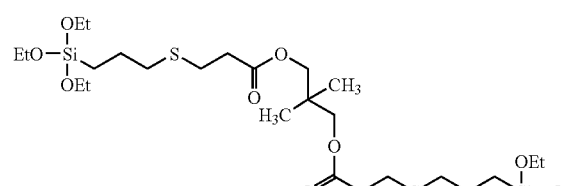
(153) 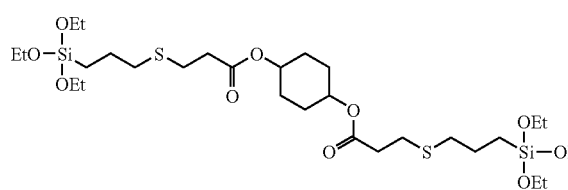
(154) 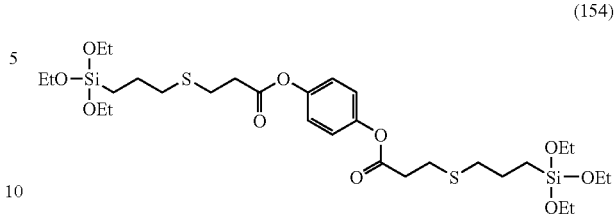
(155) 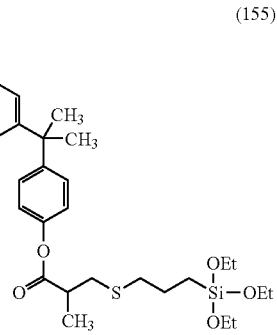
(156) 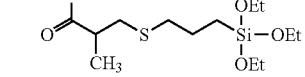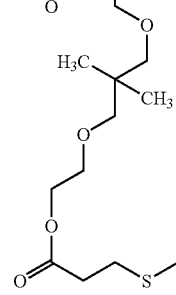
(157) 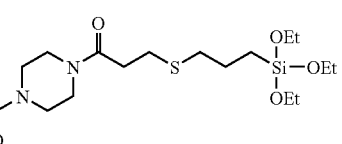
(158) 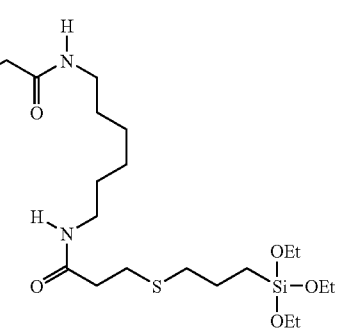

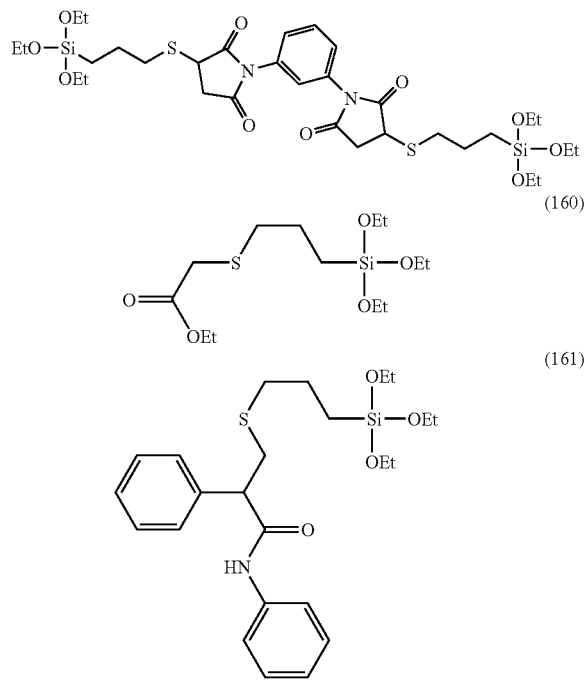

The compounds of the formula I can be prepared in per se known manner. For example DE-A-173 898 discloses the addition of a mercaptan bearing a silylgroup to an activated alkene like acrylates catalyzed by a base. C. D. Hurd, L. L. Gershbein, JACS 69, 2328 (1947) disclose the base-catalyzed addition of mercaptans to acrylic and methacrylic derivatives. B. Boutevin et al., J. Fluor. Chem. 31, 437 (1986) disclose the addition of mercaptans to alkenes by radical activation. The most general method for the preparation of sulfides involves the reaction between an alkylhalogenide and a thiolate anion.

Component (c) is suitable as coupling agent for ensuring the coupling of a white reinforcing filler with an elastomer.

Elastomers are to be understood as meaning macromolecular materials which after considerable deformation under a small load at room temperature rapidly regain approximately their original shape. See also Hans-Georg Elias, "An Introduction to Polymer Science", Section 12. "Elastomers", pp. 388-393, 1997, VCH Verlagsgesellschaft mbH, Weinheim, Germany or "Ullmann's Encyclopedia of Industrial Chemistry, fifth, completely revised edition, Volume A 23", pp. 221-440 (1993).

Examples of elastomers which may be present in the compositions of the invention are the following materials:
1. Polymers of diolefins, for example polybutadiene or polyisoprene.
2. Copolymers of mono- and diolefins with one another or with other vinyl monomers, e.g. propylene-isobutylene copolymers, propylene-butadiene copolymers, isobutylene-isoprene copolymers, ethylene-alkyl acrylate copolymers, ethylene-alkyl methacrylate copolymers, ethylene-vinyl acetate copolymers, acrylonitrile-butadiene copolymers, and also terpolymers of ethylene with propylene and with a diene, such as hexadiene, dicyclopentadiene or ethylidenenorbornene.
3. Copolymers of styrene or α-methylstyrene with dienes or with acrylic derivatives, e.g. styrene-butadiene, styrene-butadiene-alkyl acrylate and styrene-butadiene-alkyl methacrylate; block copolymers of styrene, e.g. styrene-butadiene-styrene, styrene-isoprene-styrene and styrene-ethylenebutylene-styrene, and also adhesives prepared from the latter three.
4. Halogen-containing polymers, e.g. polychloroprene, chlorinated rubber, chlorinated or brominated copolymer of isobutylene-isoprene (halobutyl rubber).
5. Natural rubber.
6. Aqueous emulsions of natural or synthetic rubbers, e.g. natural rubber latex or latices of carboxylated styrene-butadiene copolymers.

The elastomers of interest are preferably natural or synthetic rubber or vulcanizates prepared therefrom. Particular preference is given to polydiene vulcanizates, halogen-containing polydiene vulcanizates, polydiene copolymer vulcanizates, in particular styrene-butadiene copolymer vulcanizates, and ethylene-propylene terpolymer vulcanizates.

In the present application, "reinforcing" white filler is to be understood to mean a white filler capable of reinforcing alone, without any means other than an intermediate coupling agent, a rubber composition intended for the manufacture of tires. In other words the reinforcing white filler is capable of replacing a conventional carbon black filler in its reinforcing function.

Preferably, the reinforcing white filler is silica ($SiO_2$) or alumina ($Al_2O_3$), or a mixture of these two fillers.

The silica used may be any reinforcing silica known to the person skilled in the art, in particular any precipitated or pyrogenic silica having a BET surface area and a specific CTAB surface area both of which are less than 450 $m^2/g$. The highly dispersable precipitated silicas are preferred, in particular when the invention is used to manufacture tires having a low rolling resistance. "Highly dispersible silica" is understood to mean any silica having a very substantial ability to disagglomerate and to disperse in a polymer matrix, which can be observed in known manner by electron or optical microscopy on thin sections. Non-limiting examples of such preferred highly dispersible silicas, include the silica Perkasil KS 430® from Akzo, the silica BV 3380® from Degussa, the silicas Zeosil 1165 MP® and Zeosil 1115 MP® from Rhône-Poulenc, the silica Hi-Sil 2000® from PPG, the silicas Zeopol 8741® or Zeopol 8745® from Huber, and treated precipitated silicas such as, for example, the aluminium-"doped" silicas described in EP-A-0 735 088.

Preferably, the reinforcing alumina is a highly dispersable alumina having a BET surface area from 30 to 400 $m^2/g$, more preferably 80 to 250 $m^2/g$, an average particle size of at most 500 nm, more preferably at most 200 nm, a high amount of reactive Al—OH surface functions, as described in EP-A-0 810 258. Non-limitative examples of such reinforcing aluminas are in particular the aluminas A125®, CR125® and D65CR® of Baikowski.

The physical state in which the reinforcing white filler is present is immaterial, whether it be in the form of a powder, microbeads, granules or balls. The "reinforcing white filler" is also understood to mean mixtures of different reinforcing white fillers, in particular highly dispersible silicas and/or aluminas such as described above.

The reinforcing white filler may also be used in a blend (mixture) with carbon black. Suitable carbon blacks are all the carbon blacks, in particular carbon blacks of the type HAF, ISAF or conventionally used in tires and, particularly, in treads for tires. Non-limiting examples of such blacks, include th blacks N115, N134, N234, N339, N347 and N375. The quantity of carbon black present in the total reinforcing filler may vary within wide limits, this quantity preferably being less than the quantity of reinforcing white filler present in the composition.

Component (b) is usefully added to the elastomer in amounts of from 1 to 40%, for example from 1 to 30%, preferably from 5 to 30%, based on the weight of the elastomer.

Component (c) is usefully added to the elastomer in amounts of from 0.01 to 10%, for example from 0.1 to 10%, preferably from 0.5 to 5%, based on the weight of the elastomer.

In addition to components (a) and (b), the compositions of the invention may comprise further additives, such as the following:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide.

1.6. Alkylidenebisphenols, for example 2, 2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra (5-tert-butyl-4-hydroxy-2-methylphenyl)pentane.

1.7. O-, N- and S-benzyl compounds, for example 3, 5,3', 5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl) phenyl]-2,2-bis(3,5-di-tert-butyl-4-hydroxybenzyl) malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of α-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard® XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-cimethyl-4 H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene.

2. UV Absorbers and Light Stabilizers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2 H-benzotriazole with polyethylene glycol 300;

$$[R-CH_2CH_2-COO-CH_2CH_2\overline{)_2}\,,$$

where R=3'-tert-butyl-4'-hydroxy-5'-2 H-benzotriazol-2-ylphenyl, 2-[2'-hydroxy-3'-(α,α-dimethylbenzyl)-5'-(1,1,3,3-tetramethylbutyl)phenyl]-benzotriazole; 2-[2'-hydroxy-3'-(1,1,3,3-tetramethylbutyl)-5'-(α,α-dimethylbenzyl)phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β,β-methyl-p-methoxycinnamate, butyl α-cyano-β-methyl-p-methoxycinnamate, methyl α-carbomethoxy-p-methoxycinnamate and N-(β-carbomethoxy-α-cyanovinyl)-2-methylindoline.

2.5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3, 5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5] decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bisformyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine.

2.7. Oxamides, for example 4, 4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxymphenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-dicumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12 H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2"-nitrilo[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxyylamine, N-heptadecyl-N-octadecylhydroxylamine, N,N-dialkylhydroxylamine derived from hydrogenated tallow amine.

6. Nitrones, for example N-benzyl-alpha-phenylnitrone, N-ethyl-alpha-methylnitrone, N-octylalpha-heptynitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.

7. Thiosynergistic compounds, for example thiodipropionic acid dilauryl ester or thiodipropionic acid distearyl ester or compounds of formula IV

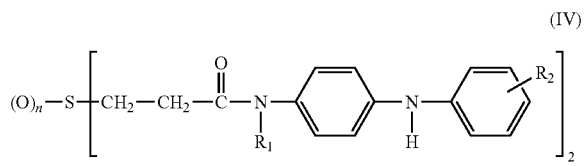

wherein
$R_1$ is hydrogen, $C_1$-$C_{12}$alkyl, cyclohexyl, phenyl or benzyl,
$R_2$ is hydrogen or $C_1$-$C_4$alkyl, and
n is the number 0, 1 or 2.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecyl mercapto)propionate.

9. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

10. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.

11. Other additives, for example plasticisers, lubricants, emulsifiers, pigments, rheology additives, catalysts, flow-control agents, optical brighteners, flameproofing agents, antistatic agents and blowing agents.

12. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A4316876; EP-A-0589839; EP-A-0591102 or EP-A-1291384 or 3-[4-(2-acetoxyethoxy)phenyl]-5,7-di-tert-butylbenzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one or 3-(2-actyl-5-isooctylphenyl)-5-isoocylbenzofuran-2-one.

Preferred compositions of the invention comprise, as other additives, one or more components selected from the group consisting of pigments, dyes, levelling assistants, dispersants, plasticizers, vulcanization activators, vulcanization accelerators, vulcanizers, charge control agents, adhesion promoters, light stabilizers or antioxidants, such as phenolic antioxidants (items 1.1 to 1.18 in the list) or aminic antioxidants (item 1.19 in the list), organic phosphites or phosphonites (item 4 in the list) and/or thiosynergists (item 7 in the list).

An example of the concentrations at which these other additives are added is from 0.01 to 10%, based on the total weight of the elastomer.

Components (b) and (c), and also, if desired, other additives are incorporated into the elastomer by known methods, for example during mixing in internal mixers with rams (Banburry), on mixing rolls or in mixing extruders, prior to or during shaping or vulcanization, or else by applying dissolved or dispersed components (b) and (c) to the elastomer, if desired with sub-sequent removal of the solvent by evaporation. When added to the elastomer, components (b) and (c) and, if desired, other additives may also be in the form of a masterbatch comprising these, for example at a concentration of from 2.5 to 25% by weight.

Components (b) and (c) and, if desired, other additives may also be added prior to or during the polymerization of synthetic elastomers or prior to crosslinking, i.e. advantageously, if desired, as a first-level mixture in the crude rubber, which may also comprise other components, such as carbon black as filler and/or extender oils.

The compounds of the formula I are bonded chemically to polymer chains and the white reinforcing filler under processing conditions (mixing, vulcanization, etc.). The compounds of the formula I are resistant to extraction, i.e. they continue to offer good protection after the substrate is subjected to intensive extraction. The loss of compounds of the formula I from the elastomer via migration or extraction is extremely slight.

Components (b) and (c) and, if desired, other additives may be in pure form or encapsulated in waxes, in oils or in polymers when they are incorporated into the elastomer to be treated.

Components (b) and (c) and, if desired, other additives may also be sprayed onto the elastomer to be treated.

The resultant elastomers may be used in a wide variety of forms, e.g. ribbons, moulding compositions, profiles, conveyor belts or tires (pneumatic).

The present invention further provides a process for ensuring the coupling of a white reinforcing filler to elastomer compositions reinforced by a white filler, which comprises incorporating into the elastomer at least one component (c) and then vulcanizing the composition.

A further embodiment of the present invention is the use of component (b) as coupling agent for ensuring the coupling of a white reinforcing filler with an elastomer.

The preferred compounds of the formula I [component (c)] for the process and use listed above are the same as those for the compositions of the invention.

The present invention further provides novel compounds of the formula Ia

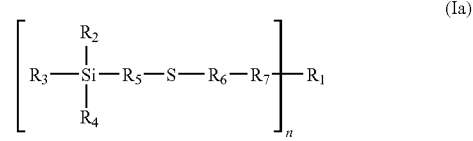

wherein, when n is 1,
$R_1$ is hydrogen, $C_1$-$C_{25}$alkyl, $C_1$-$C_{25}$alkyl substituted with furyl, morpholine, $C_1$-$C_4$dialkylamino, $C_1$-$C_4$-trialkylammonium or $M^{+-}O_3S$—; $C_2$-$C_{25}$alkyl interrupted by oxygen; $C_5$-$C_{12}$cycloalkyl, $C_2$-$C_{25}$alkenyl, unsubstituted or $C_1$-$C_4$alkyl-substituted phenyl; $C_7$-$C_{12}$-phenoxyalkyl, unsubstituted or $C_1$-$C_4$alkyl substituted $C_7$-$C_9$bicycloalkyl;

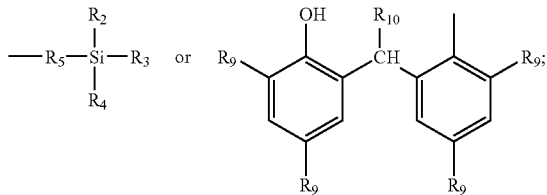

when n is 2, $R_1$ is $C_1$-$C_{25}$alkylene, $C_1$-$C_{25}$alkylene substituted with $C_1$-$C_4$alkyl; $C_2$-$C_{25}$alkylene substituted with $C_1$-$C_4$alkyl and interrupted by oxygen; $C_2$-$C_{25}$alkylene interrupted by oxygen, sulfur, phenylene or cyclohexylene;

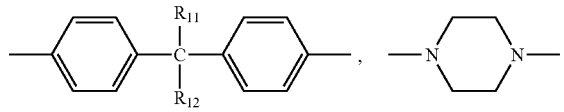

or

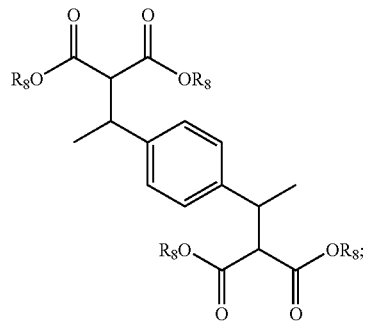

or when $R_8$ and $R_7$ are a direct bond, $R_1$ is

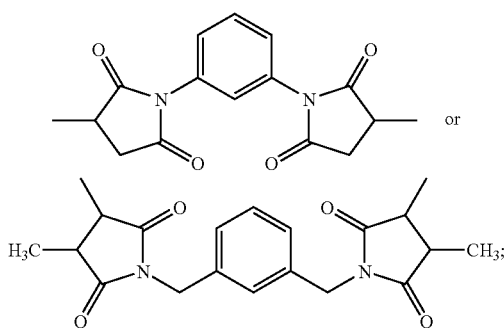

$R_2$, $R_3$ and $R_4$ are each independently of the others $C_1$-$C_{25}$alkyl, $C_2$-$C_{25}$alkyl interrupted by oxygen; $C_5$-$C_{12}$cycloalkyl, $C_2$-$C_{25}$alkenyl, unsubstituted or $C_1$-$C_4$alkyl-substituted phenyl, $C_7$-$C_9$phenylalkyl, $C_1$-$C_{25}$alkoxy, $C_3$-$C_{25}$alkoxy interrupted by oxygen; $C_5$-$C_{12}$cycloalkoxy, $C_2$-$C_{25}$alkenyloxy, unsubstituted or $C_1$-$C_4$alkyl-substituted phenoxy, $C_7$-$C_9$phenylalkoxy, halogen, $C_2$-$C_{25}$alkanoyloxy or unsubstituted or $C_1$-$C_4$alkyl substituted benzoyloxy; with the proviso that at least one of $R_2$, $R_3$ or $R_4$ is $C_1$-$C_{25}$alkoxy, $C_3$-$C_{25}$alkoxy interrupted by oxygen; $C_5$-$C_{12}$cycloalkoxy, $C_2$-$C_{25}$alkenyloxy, unsubstituted or $C_1$-$C_4$alkyl-substituted phenoxy, $C_7$-$C_9$phenylalkoxy, halogen, $C_2$-$C_{25}$alkanoyloxy or unsubstituted or $C_1$-$C_4$alkyl substituted benzoyloxy;

$R_5$ is $C_1$-$C_{25}$alkylene, $C_5$-$C_{12}$cycloalkylene, unsubstituted or $C_1$-$C_4$alkyl substituted phenylene;

$R_6$ is a direct bond, $C_1$-$C_{25}$alkylene; or $C_1$-$C_{25}$alkylene substituted with $C_1$-$C_{25}$alkyl, $C_2$-$C_{25}$alkoxycarbonyl or phenyl;

$R_7$ is a direct bond or

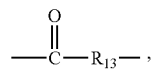

with the proviso that, when $R_7$ is a direct bond and n is 1, $R_6$ is not a direct bond; and with the proviso that, when $R_7$ is

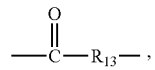

$R_6$ is not a direct bond;

$R_8$ is $C_1$-$C_{25}$alkyl, $C_2$-$C_{25}$alkyl interrupted by oxygen; $C_5$-$C_{12}$cycloalkyl, $C_2$-$C_{25}$alkenyl, $C_2$-$C_{25}$alkinyl, $C_7$-$C_9$phenylalkyl, unsubstituted or $C_1$-$C_4$alkyl-substituted phenyl, $R_9$ is $C_1$-$C_5$alkyl, $R_{10}$ is hydrogen or $C_1$-$C_4$alkyl, $R_{11}$ and $R_{12}$ are each independently of the other hydrogen, $CF_3$, $C_1$-$C_{12}$alkyl or phenyl, or $R_{11}$ and $R_{12}$, together with the carbon atom to which they are bonded, form a $C_5$-$C_8$-cycloalkylidene ring that is unsubstituted or substituted by from 1 to 3 $C_1$-$C_4$alkyl groups, $R_{13}$ is oxygen or —N($R_{14}$)—, $R_{14}$ is hydrogen or $C_1$-$C_{12}$alkyl, M is sodium, potassium or ammonium, and n is 1 or 2; or an oligomeric hydrolysis product of the compound of the formula Ia.

Of special interest are the compounds of the formula Ia wherein when n is 1, $R_1$ is hydrogen, $C_1$-$C_{18}$alkyl, $C_1$-$C_{18}$alkyl substituted with furyl, morpholine, $C_1$-$C_4$dialkylamino, $C_1$-$C_4$-trialkylammonium or $M^+$$O_3$S—; $C_2$-$C_{12}$alkyl interrupted by oxygen; cyclohexyl, $C_2$-$C_{12}$-alkenyl, phenyl, $C_7$-$C_{10}$phenoxyalkyl, unsubstituted or $C_1$-$C_4$alkyl substituted $C_7$-$C_9$bicyclo-alkyl;

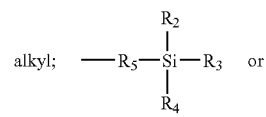

or

-continued

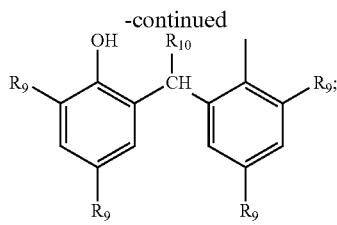

when n is 2,
R$_1$ is C$_1$-C$_{12}$alkylene, C$_2$-C$_{12}$alkylene substituted with methyl; C$_2$-C$_{12}$alkylene substituted with methyl and interrupted by oxygen; C$_4$-C$_{12}$alkylene interrupted by oxygen, sulfur, phenylene or cyclohexylene;

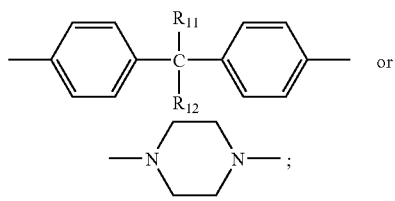

R$_2$, R$_3$ and R$_4$ are each independently of the others C$_1$-C$_8$alkyl, C$_4$-C$_8$alkyl interrupted by oxygen; cyclohexyl, C$_2$-C$_{12}$alkenyl, benzyl, C$_1$-C$_8$alkoxy, C$_3$-C$_8$alkoxy interrupted by oxygen; C$_5$-C$_8$cyclohexyloxy, C$_2$-C$_{12}$alkenyloxy, phenoxy, benzyloxy, chloro, bromo, C$_2$-C$_8$alkanoyloxy or benzoyloxy; with the proviso that at least one of R$_2$, R$_3$ or R$_4$ is C$_1$-C$_8$alkoxy, C$_3$-C$_8$alkoxy interrupted by oxygen; cyclohexyloxy, C$_2$-C$_{12}$alkenyloxy, phenoxy, benzyloxy, chloro, bromo, C$_2$-C$_8$alkanoyloxy or benzoyloxy;
R$_5$ is C$_2$-C$_8$alkylene, cyclohexylene or phenylene;
R$_6$ is C$_1$-C$_8$alkylene; C$_1$-C$_8$alkylene substituted with C$_1$-C$_4$alkyl, C$_2$-C$_8$alkoxycarbonyl or phenyl;
R$_7$ is

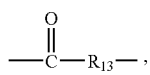

R$_8$ is C$_1$-C$_{12}$alkyl, C$_2$-C$_{12}$alkyl interrupted by oxygen; cyclohexyl, C$_2$-C$_{12}$alkenyl, C$_2$-C$_{12}$alkinyl, benzyl or phenyl,
R$_9$ is C$_1$-C$_5$alkyl,
R$_{10}$ is hydrogen or methyl,
R$_{11}$ and R$_{12}$ are each independently of the other hydrogen or C$_1$-C$_8$alkyl, or R$_{11}$ and R$_{12}$, together with the carbon atom to which they are bonded, form a cyclohexylidene ring that is unsubstituted or substituted by from 1 to 3 methyl groups,
R$_{13}$ is oxygen or —N(R$_{14}$)—,
R$_{14}$ is hydrogen or C$_1$-C$_8$alkyl,
M is sodium or potassium, and
n is 1 or 2; or an oligomeric hydrolysis product of the compound of the formula Ia.
Of very special interest are the new compounds of the formula Ia wherein
when n is 1,
R$_1$ is hydrogen, C$_1$-C$_{18}$alkyl, C$_1$-C$_4$alkyl substituted with furyl, morpholine, C$_1$-C$_4$dialkylamino, C$_1$-C$_4$-trialkylammonium or M$^{+-}$O$_3$S—; C$_2$-C$_6$alkyl interrupted by oxygen; cyclohexyl, C$_4$-C$_{10}$alkenyl, phenyl; C$_7$-C$_9$phenoxyalkyl, unsubstituted or C$_1$-C$_4$alkyl substituted C$_7$-C$_9$bicycloalkyl; or

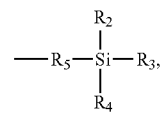

when n is 2,
R$_1$ is C$_2$-C$_6$alkylene, C$_2$-C$_4$alkylene substituted with methyl; C$_4$-C$_8$alkylene substituted with methyl and interrupted by oxygen; C$_4$-C$_8$alkylene interrupted by oxygen;

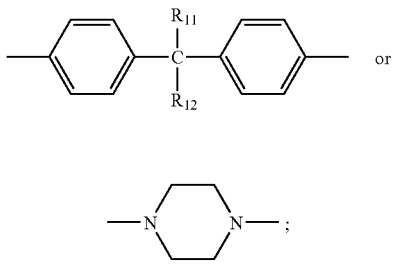

R$_2$, R$_3$ and R$_4$ are each independently of the others C$_1$-C$_4$alkyl or C$_1$-C$_4$alkoxy; with the proviso that at least one of R$_2$, R$_3$ or R$_4$ is C$_1$-C$_4$alkoxy;
R$_5$ is C$_2$-C$_4$alkylene, R$_6$ is C$_1$-C$_3$alkylene; or C$_1$-C$_3$alkylene substituted with methyl, C$_2$-C$_3$alkoxycarbonyl or phenyl;
R$_7$ is

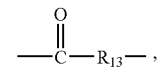

R$_{11}$ and R$_{12}$ are each independently of the other hydrogen or C$_1$-C$_4$alkyl,
R$_{13}$ is oxygen or —N(R$_{14}$)—,
R$_{14}$ is hydrogen,
M is potassium, and
n is 1 or 2; or an oligomeric hydrolysis product of the compound of the formula Ia.

The preferred meanings of the general symbols in the novel compounds of the formula Ia are the same as the preferred meanings of the general symbols set out in relation to the compositions of the invention.

The examples below further illustrate the invention. Data in parts or percentages are based on weight.

EXAMPLE 1

Preparation of 3-(3-triethoxy-silanyl-propylsulfanyl)-propionic acid iso-octyl ester (compound 101)

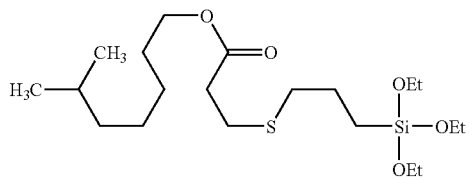
(101)

A dry reaction flask is flushed with nitrogen and charged with 7.6 g of sodium hydride (60% in mineral oil, 0.19 mol) and washed with 50 ml of hexane. The hexane phase is carefully decanted and 150 ml of DMF is added. Then within 30 minutes 44 g (0.2 mol) of 3-mercaptopropionic acid iso-octylester (isomeric mixture, CAS 30374-01-7) is dropped at 10-15° C. to the stirred sodium hydride suspension. After stirring at room temperature for 1.5 hours, the reaction mixture is cooled again to 10° C. and 48.1 g (0.19 mol) of 3-chloropropyl-triethoxysilane is added within 5 minutes. The reaction mixture is heated to 50° C. and stirring continued for 17 hours. The reaction mixture is cooled to room temperature and filtered using a glass sinter funnel. The filtrate is evaporated and the liquid residue fractionated using high vacuum. The compound 101 is obtained as clear liquid having a boiling range of 146-155° C. (0.08 mbar).

In analogy to Example 1, the following compounds 102-104 are obtained from the corresponding thiol. The physical datas are summarized in Table 1.

TABLE 1

| Compound | Formula | Physical Data |
|---|---|---|
| 102 | ![structure] | b.p. 105-100° C. (0.04 mbar) |
| 103 | ![structure] | b.p. 167° C. (0.05 mbar) |
| 104 | ![structure] | b.p. 111-114° C. (0.05 mbar) |
| 105 | ![structure] | b.p. 108° C. (0.05 mbar) |

EXAMPLE 2

Preparation of 3-(3-trimethoxy-silanyl-propylsulfanyl)-2-methyl-propionic acid methyl ester (compound 106)

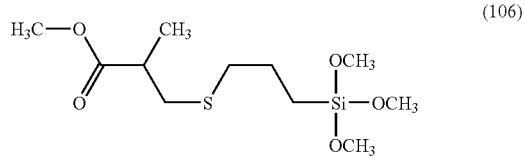
(106)

To an agitated solution of 30.4 g (0.15 mol) of 3-thiopropyl-trimethoxysilane in 60 ml of methanol is added 0.3 g of sodium methanolate. After cooling to minus 10° C., 15.1 g (0.15 mol) of methyl methacrylate is dropped within 50 minutes to the mixture. Then the cooling bath is removed and stirring is continued for 4 hours. The reaction mixture is evaporated to dryness, the residue redissolved in 50 ml of methylene chloride, filtered through a glass sinter funnel and the filtrate evaporated to dryness using first a rotary evaporator then secondly a high vacuum to give compound 106. $^1$H-NMR: (ppm, 300 MHz, CDCl$_3$) 0.7-0.8 (m, 2 H); 1.2-1.3 (m, 3 H); 1.6-1.8 (m, 2 H); 2.5-2.9 (m, 5 H); 3.56 (s, 9 H); 3.7 (s, 3 H).

In analogy to Example 2, the following compounds 107-112 were obtained from the corresponding acrylates and silanes. The physical datas are summarized in Table 2.

TABLE 2

| Compound | Formula | Physical Data |
|---|---|---|
| 107 | [N≡C-CH₂-CH₂-S-CH₂-CH₂-CH₂-Si(OCH₃)₂CH₃] | $^1$H-NMR: (ppm, 400 MHz, CDCl$_3$) 0.13 (s, 3 H); 0.6-0.8 (m, 2 H); 1.6-1.75 (m, 2 H); 2.6-2.7 (m, 4 H); 2.75-2.8 (m, 2 H); 3.5 (s, 6 H) |
| 108 | [H₃C-O-C(O)-CH₂-CH₂-S-CH₂-CH₂-CH₂-Si(OCH₃)₂CH₃] | $^1$H-NMR: (ppm, 300 MHz, CDCl$_3$) 0.13 (s, 3 H); 0.65-0.8 (m, 2 H); 1.6-1.75 (m, 2 H); 2.5-2.65 (m, 4 H); 2.7-2.85 (m, 2 H); 3.5 (s, 6 H); 3.7 (s, 3 H) |
| 109 | [(CH₃O)₃Si-CH₂CH₂CH₂-S-CH₂-CH(CH₃)-C(O)-O-CH₂CH₂CH₂-Si(OCH₃)₃] | $^1$H-NMR: (ppm, 400 MHz, CDCl$_3$) 0.6-0.8 (2 m, 4 H); 1.25 (d, 3 H); 1.6-1.8 (m, 4 H); 2.5-2.85 (m, 5 H); 3.57 (s, 18 H); 3.7 (s, 2 H) |
| 110 | [H₃C-O-C(O)-CH₂-CH(C(O)-O-CH₃)-CH₂-S-CH₂CH₂CH₂-Si(OCH₃)₃] | $^1$H-NMR: (ppm, 300 MHz, CDCl$_3$) 0.7-0.8 (m, 2 H); 1.6-1.75 (m, 2 H); 2.5-2.95 (m, 6 H); 3-3.1 (m, 1 H); 3.57 (s, 9 H); 3.69 (s, 3 H); 3.72 (s, 3 H) |
| 111 | [EtO-C(O)-CH₂-CH(C(O)-OEt)-S-CH₂CH₂-Si(OEt)₃] | ESI-MS: m/z 410.1 |
| 112 | [(EtO)₃Si-...-O-C(O)-...-S-...-O-cyclohexyl] | $^1$H-NMR: (ppm, 400 MHz, CDCl$_3$) 0.7-0.8 (m, 2 H); 1.23 (t, 9 H); 1.3-1.9 (m, 12 H); 2.5-2.6 (m, 4 H); 2.75-2.8 (m, 2 H); 3.82 (q, 6 H); 4.75-4.85 (m, 1 H) |

EXAMPLE 3

Preparation of Compound 113

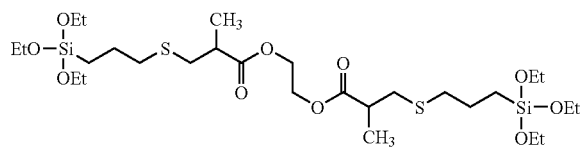

To a stirred solution of 36.5 g (0.15 mol) of 3-thiopropyl-triethoxysilane in 60 ml of dry ethanol under a nitrogen atmosphere 0.3 g of sodium ethanolate is added and the solution cooled to minus 15° C. Within 45 minutes 15.3 g (0.075 mol) of ethylene glycol dimethacrylate is dropped to the thiolate solution keeping the temperature at minus 10° C. The cooling bath is then removed and stirring continued for 4.5 hours. The reaction mixture is evaporated to dryness, redissolved in methylene chloride and filtered through a glass sinter funnel. The filtrate is evaporated to dryness and the residue dried in high vacuum. After drying the liquid is filtered again using a 0.45 μm paperfilter to give compound 113 as clear liquid. $^1$H-NMR: (ppm, 400 MHz, CDCl$_3$) 0.7-0.8 (m, 4 H); 1.15-1.3 (m, 24 H); 1.65-1.75 (m, 4 H); 2.5-2.9 (m, 10 H); 3.82 (q, 12 H); 4.1-4.4 (m, 4 H).

In analogy to Example 3 the following compounds 114-119 were obtained from the corresponding diacrylates or dimethacrylates. The physical datas are summarized in Table 3.

TABLE 3

| Compound | Formula | Physical Data |
| --- | --- | --- |
| 114 | | liquid<br>$^1$H-NMR: (ppm, 400 MHz, CDCl$_3$) 0.7-0.8 (m, 4 H); 1.15-1.75 (m, 30 H); 2.5-2.65 (m, 8 H); 2.75-2.8 (m, 4 H); 3.6-3.85 (m, 12 H); 4.05-4.2 (m, 4 H) |
| 115 | | viscous liquid<br>$^1$H-NMR: (ppm, 400 MHz, CDCl$_3$) 0.65-0.8 (m, 4 H); 1.05-1.35 (m, 24 H); 1.6-1.75 (m, 4 H); 2.5-2.85 (m, 10 H); 3.55-4.3 (m, 28 H) |

TABLE 3-continued

| Compound | Formula | Physical Data |
|---|---|---|
| 116 | | ¹H-NMR: (ppm, 400 MHz, CDCl₃) 0.7-0.75 (m, 4 H); 1.23 (t, 18 H); 1.6-1.8 (m, 8 H); 2.54-2.65 (m, 8 H); 2.75-2.8 (m, 4 H); 3.82 (q, 12 H); 4.1-4.2 (m, 4 H) |
| 117 | | ESI-MS: m/z 702 |
| 118 | | ESI-MS: m/z 718.2 |
| 119 | | ESI-MS: m/z 55822 |

EXAMPLE 4

Preparation of Compound 120

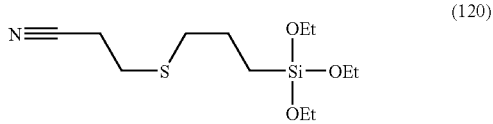

To a suspension of 110 mg (1.00 mmol) of potassium tert-butanolate in 50 ml of dry toluene is added dropwise under nitrogen at 0° C. 23.8 (100 mmol) of 3-mercapto-propyltriethoxysilane. The reaction mixture is stirred for 30 minutes at room temperature, then 6.4 g (120 mmol) of acrylonitrile is added dropwise. The reaction mixture is stirred for 12 hours and then evaporated to dryness using a vacuum rotary evaporator. The residue is redissolved in 20 ml of methylene chloride and filtrate through a glass sinter funnel. The filtrate is evaporated using a vacuum rotary evaporator to afford 24.3 g (83%) of compound 120, yellow liquid. $^1$H-NMR ($^1$H 400 MHz, CDCl$_3$): δ=3.82 (q, J=7.2 Hz, OCH$_2$, 6H), 2.78 (t, J=7.2 Hz, CN—CH$_2$, 2H), 2.70-2.55 (m, CH$_2$—S—CH$_2$, 4H), 1.75-1.65 (m, Si—CH$_2$—CH$_2$, 2H), 1.23 (t, J=7.2 Hz, OCH$_2$CH$_3$, 9 H), 0.80-0.70 (m, Si—CH$_2$, 2H).

In analogy to Example 4 the following compounds 121-123 were obtained from the corresponding acrylates or substituted acrylates.

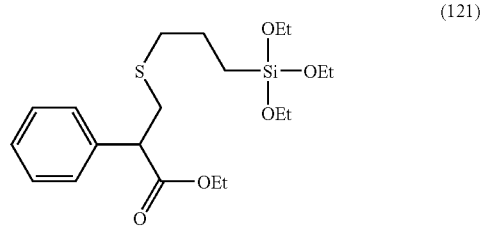

$^1$H-NMR ($^1$H 400 MHz, CDCl$_3$): δ=7.35-7.20 (m, 5 arom. H), 4.25-4.05 (m, CO$_2$CH$_2$, 2H), 3.85-3.70 (m, Ph-CH+SiOCH$_2$, 7H), 3.21 (dd, J=13.2, 9.2 Hz, S—CHH, 1H), 2.85 (dd, J=13.2, 6.0 Hz, S—CHH, 1H), 2.53 (t, J=7.2 Hz, Si—CH$_2$—CH$_2$—CH$_2$, 2H), 1.75-1.62 (m, Si—CH$_2$—CH$_2$, 2H), 1.30-1.10 (m, OCH$_2$CH$_3$+SiOCH$_2$CH$_3$, 12H), 0.75-0.65 (m, Si—CH$_2$, 2H). GC-MS (CI): 414 (M$^+$). Colourless liquid (b.p. 80° C./0.9 mbar) [compound 121].

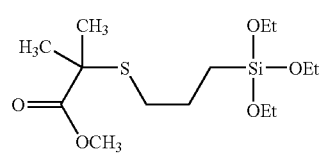

$^1$H-NMR ($^1$H 300 MHz, CDCl$_3$): δ=4.17 (q, J=7.2 Hz, CO$_2$CH$_2$, 2H), 3.81 (q, J=7.2 Hz, SiOCH$_2$, 6H), 2.63 (t, J=7.2 Hz, S—CH$_2$, 2H), 1.73-1.58 (m, S—CH$_2$—CH$_2$, 2H), 1.50 (s, CH$_3$, 6H), 1.28 (t, J=7.2 Hz, CO$_2$CH$_2$CH$_3$, 3H), 1.22 (t, J=7.2 Hz, SiOCH$_2$CH$_3$, 9H), 0.75-0.65 (m, Si—CH$_2$, 2H). $^{13}$C-NMR (75 MHz, CDCl$_3$): 174.6 (s), 61.4 (t), 58.9 (t), 47.1 (s), 33.1 (t), 26.1 (q), 23.5 (t), 18.6 (q), 14.5 (q), 10.6 (t). Colourless liquid (b.p. 110° C./0.02 mbar) [compound 122].

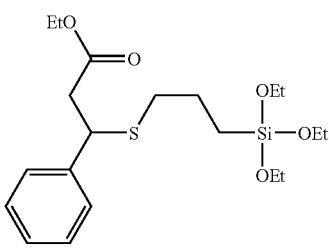

$^1$H-NMR ($^1$H 300 MHz, CDCl$_3$): δ=7.35-7.20 (m, 5 arom. H), 4.30-4.20 (m, Ph-CH, 1H), 4.10-4.00 (m, CO$_2$CH$_2$CH$_3$, 2H), 3.85-3.70 (m, SiOCH$_2$, 6H), 2.93-2.78 (m, Ph-CH—CH$_2$, 2H), 2.43-2.28 (m, S—CH$_2$, 2H), 1.70-1.50 (m, S—CH$_2$—CH$_2$, 2H), 1.25-1.10 (m, SiOCH$_2$CH$_3$+CO$_2$CH$_2$CH$_3$, 12H), 0.75-0.55 (m, Si—CH$_2$, 2H). Yellow liquid [compound 123].

EXAMPLE 5

Preparation of Compound 160

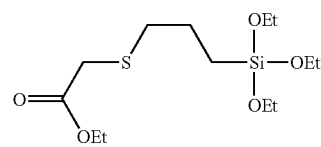

To a solution of 4.20 g (62.0 mmol) of sodium ethanolate in 70 ml of ethanol is added dropwise under nitrogen at 0° C. 15.6 g (62 mmol) of 3-mercapto-propyltriethoxysilane. The reaction mixture is stirred for 30 minutes at room temperature, then 10.6 g (62 mmol) of ethyl bromoacetate is added dropwise. The reaction mixture is stirred for 2 hours and the suspension is filtered off through a glass microfiber paper. The filtrate is evaporated to dryness using a vacuum rotary evaporator. The residue is purified by distillation under vacuum to afford 14.4 g (72%) of compound 160, colourless liquid. $^1$H-NMR ($^1$H 300 MHz, CDCl$_3$): δ=4.10 (q, J=7.2 Hz, CO$_2$CH$_2$, 2H); 3.73 (q, J=7.2 Hz, SiOCH$_2$, 6H); 3.11 (s, COCH$_2$S, 2 H); 2.58 (t, J=7.2 Hz, SCH$_2$, 2H); 1.70-1.55 (m, SiCH$_2$CH$_2$, 2H); 1.20 (t, J=7.2 Hz, CO$_2$CH$_2$CH$_3$, 3H); 1.14 (t, J=7.2 Hz, OCH$_2$CH$_3$, 9H); 0.70-0.55 (m, SiCH$_2$, 2H). $^{13}$C-NMR (75 MHz, CDCl$_3$): 170.78 (s); 61.43 (t); 58.64 (t); 35.90 (t); 33.80 (t); 22.95 (t); 18.56 (q); 14.43 (q); 10.10 (t).

EXAMPLE 6

Preparation of Compound 161

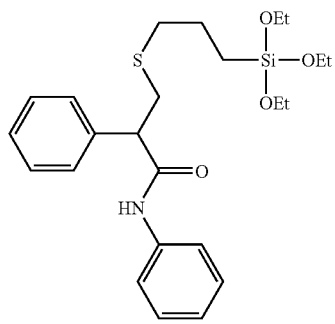
(161)

To a suspension of 12 mg (0.11 mmol) of potassium t-butanolate in 10 ml of dry toluene is added dropwise under nitrogen at 0° C. 2.71 g (10.8 mmol) of 3-mercapto-propyl-triethoxysilane. The reaction mixture is stirred for 30 min at room temperature, then 2.41 g (10.8 mmol) of 2,N-diphenylacrylamide dissolved in 100 ml of dry toluene is added dropwise. The reaction mixture is stirred for 12 hours and then evaporated to dryness using a vacuum rotary evaporator. The residue is redissolved in methylene chloride (20 ml) and the organic phase is washed with water, brine, dried over sodium sulfate, filtered off and evaporated to dryness using a vacuum rotary evaporator to afford 4.35 g (87%) of compound 161, white solid, m.p. 38-43° C. $^1$H-NMR ($^1$H 300 MHz, CDCl$_3$): δ=7.71 (br s, NH, 1H); 7.55-7.00 (m, 10 arom. H); 3.90-3.70 (m, SiOCH$_2$+PhCH, 7H); 3.45-3.35 (m, PhCH-CHH, 1H); 2.95-2.85 (m, PhCHCHH, 1H); 2.70-2.45 (m, SCH$_2$, 2H); 1.80-1.65 (m, SiCH$_2$CH$_2$, 2H); 1.30-1.15 (m, OCH$_2$CH$_3$, 9H); 0.90-0.60 (m, SiCH$_2$, 2H). $^{13}$C-NMR (75 MHz, CDCl$_3$): 170.84 (s); 139.05 (s); 138.25 (s); 129.37 (d); 129.27 (d); 128.33 (d); 128.23 (d); 124.73 (d); 120.39 (d); 58.85 (t); 55.45 (d); 36.57 (t); 36.10 (t); 23.57 (s); 18.71 (q); 9.96 (t).

EXAMPLE 7

Coupling of Silica in a Styrene-Butadiene Rubber

A basic compound containing 100 parts of SSBR [SSBR Nipol NS 210®; styrene-butadiene rubber from Nippon Zeon/Japan], 2.5 parts of ZnO and 1.5 parts of stearic acid is mixed on an open two roll mill at 60° C. The incorporation of the coupling agent according to Table 4 and the coupling reaction with 35 parts of silica silica [Ultrasil VN3® from Degussa] is conducted in a Brabender laboratory mixer with cam blades at 145° C. The torque at the cam blades and the stock temperature is recorded continuously. The curing system is subsequently added on the two roll mill at 60° C. The Rheometer curves are measured at 150° C. Rubber samples for testing are compression molded to T95 of the Rheometer curve at 150° C. In order to assess the coupling effect the following test have been conducted: Tensile test with ISO S 2 dumb-bells (DIN 53 504). Heat build up (Goodrich flexometer) according to ASTM D 623; and Compression set (recovered height) according to DIN 53 517.

The elongation at break and the modulus 100 of the tensile test, the sample temperature after the Flexometer test and the recovered height are indications for coupling efficiency. The recorded torque during the Brabender mixing procedure and the TS2 value of the Rheometer curve indicates the scorch resistance of a coupling agent. The compounds of the formula I fulfil the high criteria as coupling agents for silica in a styrene-butadiene rubber. The results are summarized in Table 4.

TABLE 4

| Example | Coupling agent | Maximum torque (Nm) at 155° C./15 min./40 rpm |
| --- | --- | --- |
| 7a[a)] | none | 33.4 |
| 7b[b)] | 6% compound 111 | 10.5 |
| 7c[b)] | 5.5% compound 122 | 14.3 |
| 7c[b)] | 5% compound 160 | 19.6 |

[a)]Comparison Example.
[b)]Example according to the invention.

What is claimed is:

1. A composition comprising
    a) a naturally occurring or synthetic elastomer susceptible to oxidative, thermal, dynamic, light induced and/or ozone-induced degradation,
    b) a white reinforcing filler, and
    c) as coupling agent, at least one compound of the formula I $$\left[ R_3\!-\!\underset{R_4}{\overset{R_2}{\underset{|}{\overset{|}{Si}}}}\!-\!R_5\!-\!S\!-\!R_6\!-\!R_7 \right]_{\!n}\!\!\!-\!R_1 \tag{I}$$

wherein, when n is 1, $R_1$ is hydrogen, $C_1$-$C_{25}$alkyl, $C_1$-$C_{25}$alkyl substituted with furyl, morpholine, $C_1$-$C_4$dialkylamino, $C_1$C$_4$-trialkylammonium or M$^{+-}$O$_3$S—; $C_2$-$C_{25}$alkyl interrupted by oxygen; $C_5$-$C_{12}$cycloalkyl, $C_2$-$C_{25}$alkenyl, unsubstituted or $C_1$-$C_4$alkyl substituted $C_7$-$C_9$bicycloalkyl;

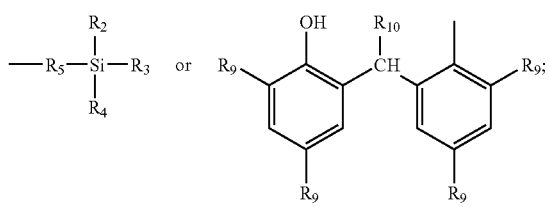

or when $R_7$ is a direct bond, $R_1$ is —CN, —SOR$_8$, —SO$_2$R$_8$, —NO$_2$ or —COR$_8$, when n is 2, $R_1$ is $C_1$-$C_{25}$alkylene, $C_1$-$C_{25}$alkylene substituted with $C_1$-$C_4$alkyl; $C_2$-$C_{25}$alkylene substituted with $C_1$-$C_4$alkyl and interrupted by oxygen; $C_2$-$C_{25}$alkylene interrupted by oxygen, sulfur, phenylene or cyclohexylene;

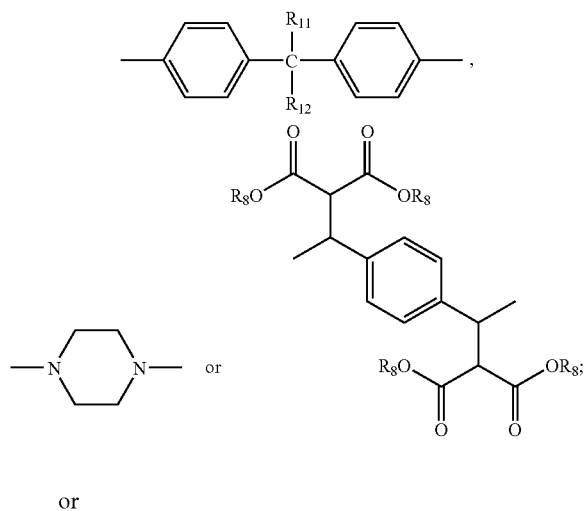

or when $R_6$ and $R_7$ are a direct bond, $R_1$ is

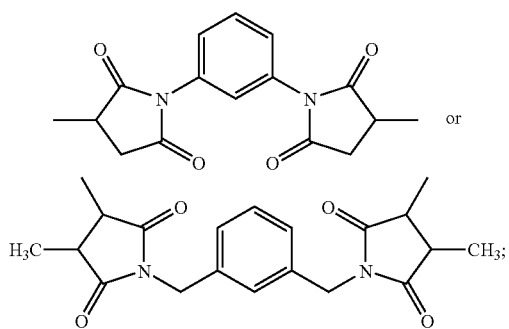

$R_2$, $R_3$ and $R_4$ are each independently of the others $C_1$-$C_{25}$alkyl, $C_2$-$C_{25}$alkyl interrupted by oxygen; $C_5$-$C_{12}$cycloalkyl, $C_2$-$C_{25}$alkenyl, unsubstituted or $C_1$-$C_4$alkyl-substituted phenyl, $C_7$-$C_9$phenylalkyl, $C_1$-$C_{25}$alkoxy, $C_3$-$C_{25}$alkoxy interrupted by oxygen; $C_5$-$C_{12}$cycloalkoxy, $C_2$-$C_{25}$alkenyloxy, unsubstituted or $C_1$-$C_4$alkyl-substituted phenoxy, $C_7$-$C_9$phenylalkoxy, halogen, $C_2$-$C_{25}$alkanoyloxy or unsubstituted or $C_1$-$C_4$alkyl substituted benzoyloxy; with the proviso that at least one of $R_2$, $R_3$ or $R_4$ is $C_1$-$C_{25}$alkoxy, $C_3$-$C_{25}$alkoxy interrupted by oxygen; $C_5$-$C_{12}$cycloalkoxy, $C_2$-$C_{25}$alkenyloxy, unsubstituted or $C_1$-$C_4$alkyl substituted phenoxy, $C_7$-$C_9$phenylalkoxy, halogen, $C_2$-$C_{25}$alkanoyloxy or unsubstituted or $C_1$-$C_4$alkyl substituted benzoyloxy;

$R_5$ is $C_1$-$C_{25}$alkylene, $C_5$-$C_{12}$cycloalkylene, unsubstituted or $C_1$-$C_4$alkyl substituted phenylene;

$R_6$ is a direct bond, $C_1$-$C_{25}$alkylene; or $C_1$-$C_{25}$alkylene substituted with $C_1$-$C_{25}$alkyl, $C_2$-$C_{25}$alkoxycarbonyl or phenyl;

$R_7$ is a direct bond or

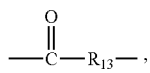

with the proviso that, when $R_7$ is a direct bond and n is 1, $R_6$ is not
a direct bond; and with the proviso that, when $R_7$ is

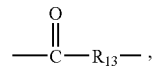

$R_6$ is not a direct bond;

$R_8$ is $C_1$-$C_{25}$alkyl, $C_2$-$C_{25}$alkyl interrupted by oxygen; $C_5$-$C_{12}$cycloalkyl, $C_2$-$C_{25}$alkenyl, $C_2$-$C_{25}$alkinyl, $C_7$-$C_9$phenylalkyl, unsubstituted or $C_1$-$C_4$alkyl-substituted phenyl, $R_9$ is $C_1$-$C_5$alkyl, $R_{10}$ is hydrogen or $C_1$-$C_4$alkyl, $R_{11}$ and $R_{12}$ are each independently of the other hydrogen, $CF_3$, $C_1$-$C_{12}$alkyl or phenyl, or $R_{11}$ and $R_{12}$, together with the carbon atom to which they are bonded, form a $C_5$-$C_8$cycloalkylidene ring that is unsubstituted or substituted by from 1 to 3 $C_1$-$C_4$alkyl groups, $R_{13}$ is oxygen or —$N(R_{14})$—, $R_{14}$ is hydrogen or $C_1$-$C_{12}$alkyl, M is sodium, potassium or ammonium, and n is 1 or 2;

or an oligomeric hydrolysis product of the compound of the formula I.

2. A composition according to claim 1, wherein when n is 1, $R_1$ is hydrogen, $C_1$-$C_{18}$alkyl, $C_1$-$C_{18}$alkyl substituted with furyl, morpholine, $C_1$-$C_4$dialkylamino, $C_1C_4$-trialkylammonium or $M^{+-}O_3S$—; $C_2$-$C_{18}$alkyl interrupted by oxygen; $C_5$-$C_8$cycloalkyl, $C_2$-$C_{18}$alkenyl, unsubstituted or $C_1$-$C_4$alkyl- substituted phenyl; $C_7$-$C_{10}$phenoxyalkyl, unsubstituted or $C_1$-$C_4$alkyl substituted $C_7$-$C_9$bicycloalkyl;

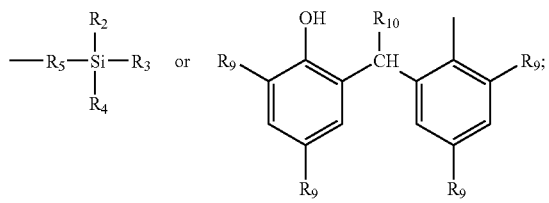

or when $R_7$ is a direct bond, $R_1$ is —CN, —$SOR_8$, —$SO_2R_8$, —$NO_2$ or —$COR_8$, when n is 2, $R_1$ is $C_1$-$C_{18}$alkylene, $C_1$-$C_{18}$alkylene substituted with $C_1$-$C_4$alkyl; $C_2$-$C_{18}$alkylene substituted with $C_1$-$C_4$alkyl and interrupted by oxygen; $C_2$-$C_{18}$alkylene interrupted by oxygen, sulfur, phenylene or
cyclohexylene;

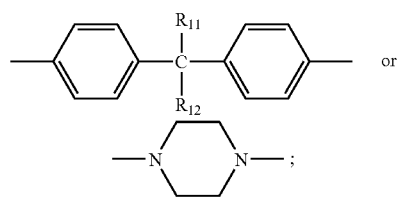

or when $R_6$ and $R_7$ are a direct
bond, $R_1$ is

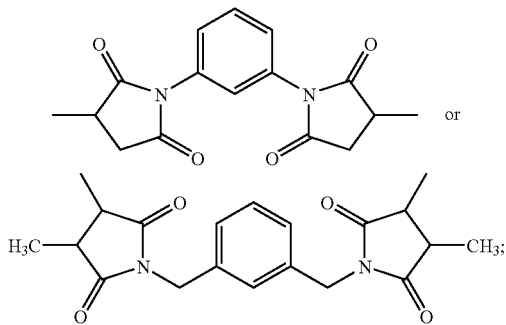

$R_2$, $R_3$ and $R_4$ are each independently of the others
  $C_1$-$C_{18}$alkyl, $C_2$-$C_{18}$alkyl interrupted by oxygen; $C_5$-
  $C_8$cycloalkyl, $C_2$-$C_{18}$alkenyl, unsubstituted or $C_1$-$C_4$alkyl-
  substituted phenyl, $C_7$-$C_9$phenylalkyl, $C_1$-$C_{18}$ alkoxy,
  $C_3$-$C_{18}$alkoxy interrupted by oxygen;
  $C_5$-$C_8$cycloalkoxy, $C_2$-$C_{18}$alkenyloxy, unsubstituted or
  $C_1$-$C_4$alkyl-substituted phenoxy, $C_7$-$C_9$phenylalkoxy,
  halogen, $C_2$-$C_{18}$alkanoyloxy or unsubstituted or
  $C_1$-$C_4$alkyl substituted benzoyloxy; with the proviso
  that at least one of $R_2$, $R_3$ or $R_4$ is $C_1$-$C_{18}$alkoxy,
  $C_3$-$C_{18}$alkoxy interrupted by oxygen;
  $C_5$-$C_8$cycloalkoxy, $C_2$-$C_{18}$alkenyloxy, unsubstituted or
  $C_1$-$C_4$alkyl substituted phenoxy, $C_7$-$C_9$phenylalkoxy,
  halogen, $C_2$-$C_{18}$alkanoyloxy or unsubstituted or
  $C_1$-$C_4$alkyl substituted benzoyloxy;
$R_5$ is $C_1$-$C_{18}$alkylene, $C_5$-$C_8$cycloalkylene, unsubstituted
  or $C_1$-$C_4$alkyl substituted phenylene;
$R_6$ is a direct bond, $C_1$-$C_{18}$alkylene; or $C_1$-$C_{18}$alkylene
  substituted with $C_1$-$C_{18}$alkyl, $C_2$-$C_{18}$-
  $C_{18}$alkoxycarbonyl or phenyl;
$R_7$ is a direct bond or

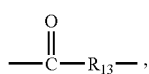

with the proviso that, when $R_7$ is a direct bond and n is 1,
  $R_6$ is not
a direct bond; and with the proviso that, when $R_7$ is

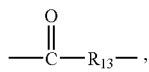

$R_6$ is not a direct bond;
$R_8$ is $C_1$-$C_{18}$alkyl, $C_2$-$C_{18}$alkyl interrupted by oxygen;
  $C_5$-$C_8$cycloalkyl, $C_2$-$C_{18}$alkenyl, $C_2C_{18}$alkinyl,
  $C_7$-$C_9$phenylalkyl, unsubstituted or $C_1$-$C_4$alkyl-substi-
  tuted phenyl,
$R_9$ is $C_1$-$C_5$alkyl,
$R_{10}$ is hydrogen or methyl,
$R_{11}$ and $R_{12}$ are each independently of the other hydrogen,
  $CF_3$, $C_1$-$C_8$alkyl or phenyl, or $R_{11}$ and $R_{12}$, together with
  the carbon atom to which they are bonded, form a
  $C_5$-$C_8$cycloalkylidene ring that is unsubstituted or sub-
  stituted by from 1 to 3 $C_1$-$C_4$alkyl groups, $R_{13}$ is oxygen or —N($R_{14}$)—,
$R_{14}$ is hydrogen or $C_1$-$C_8$alkyl,
M is sodium, potassium or ammonium, and
n is 1 or 2.
3. A composition according to claim 1, wherein $R_2$, $R_3$ and
$R_4$ are each independently of the others $C_1$-$C_4$alkyl or
$C_1$-$C_4$alkoxy; with the proviso that at least one of $R_2$, $R_3$ or $R_4$
is $C_1$-$C_4$alkoxy.
4. A composition according to claim 1, wherein $R_5$ is
$C_2$-$C_4$alkylene.
5. A composition according to claim 1, wherein when n is
1,
$R_1$ is hydrogen, $C_1$-$C_{18}$alkyl, $C_1$-$C_{12}$alkyl substituted with
  furyl, morpholine, $C_1$-$C_4$dialkylamino, $C_1$-
  $C_4$trialkylammonium or $M^+O_3S$—; $C_2$-$C_{12}$alkyl inter-
  rupted by oxygen; cyclohexyl, $C_4$-$C_{12}$-alkenyl, phenyl,
  $C_7$-$C_{10}$phenoxyalkyl, unsubstituted or $C_1$-$C_4$alkyl substi-
  tuted $C_7$-$C_9$bicycloalkyl;

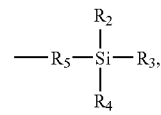

or when
$R_7$ is a direct bond, $R_1$ is —CN, —$SOR_8$ or —$SO_2R_8$;
when n is 2,
$R_1$ is $C_2$-$C_{12}$alkylene, $C_2$-$C_{12}$alkylene substituted with
  methyl; $C_2$-$C_{12}$alkylene substituted with methyl and
  interrupted by oxygen; $C_4$-$C_{12}$alkylene interrupted by
  oxygen, sulfur, phenylene or cyclohexylene;

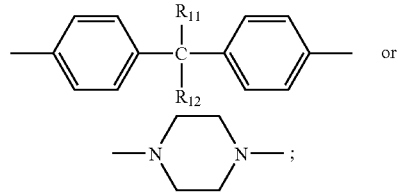

or when $R_6$ and $R_7$ are a direct bond, $R_1$ is

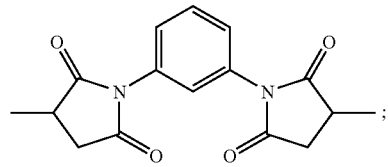

$R_2$, $R_3$ and $R_4$ are each independently of the others
  $C_1$-$C_8$alkyl, $C_4$-$C_8$alkyl interrupted by oxygen; cyclo-
  hexyl, $C_2$-$C_{12}$alkenyl, benzyl, $C_1$-$C_8$alkoxy,
  $C_3$-$C_8$alkoxy interrupted by oxygen; cyclohexyloxy,
  $C_2$-$C_{12}$alkenyloxy, phenoxy, benzyloxy, chloro, bromo,
  $C_2$-$C_8$alkanoyloxy or benzoyloxy; with the proviso that
  at least one of $R_2$, $R_3$ or $R_4$ is $C_1$-$C_8$alkoxy, $C_3$-$C_8$alkoxy
  interrupted by oxygen; cyclohexyloxy,
  $C_2$-$C_{12}$alkenyloxy, phenoxy, benzyloxy, chloro, bromo,
  $C_2$-$C_8$alkanoyloxy or benzoyloxy;
$R_5$ is $C_2$-$C_8$alkylene, cyclohexylene or phenylene;
$R_6$ is a direct bond, $C_1$-$C_8$alkylene; or $C_1$-$C_8$alkylene sub-
  stituted with $C_1$-$C_4$alkyl, $C_2$-$C_8$alkoxycarbonyl or phe-
  nyl;

$R_7$ is a direct bond or

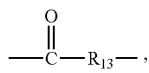

with the proviso that, when $R_7$ is a direct bond and n is 1, $R_6$ is not
a direct bond; and with the proviso that, when $R_7$ is

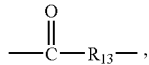

$R_6$ is not a direct bond;
$R_8$ is $C_1$-$C_{12}$alkyl, $C_2$-$C_{12}$alkyl interrupted by oxygen; cyclohexyl, $C_2$-$C_{12}$alkenyl, $C_2$-$C_{12}$alkinyl, benzyl or phenyl,
$R_{11}$ and $R_{12}$ are each independently of the other hydrogen or $C_1$-$C_8$alkyl, or $R_{11}$ and $R_{12}$, together with the carbon atom to which they are bonded, form a cyclohexylidene ring that is unsubstituted or substituted by from 1 to 3 methyl groups,
$R_{13}$ is oxygen or —$N(R_{14})$—,
$R_{14}$ is hydrogen or $C_1$-$C_4$alkyl,
M is sodium or potassium, and
n is 1 or 2.

6. A composition according to claim 1, wherein when n is 1,
$R_1$ is hydrogen, $C_1$-$C_{18}$alkyl, $C_1$-$C_8$alkyl substituted with furyl, morpholine, $C_1$-$C_4$dialkylamino, $C_1$-$C_4$trialkylammonium or $M^{+-}O_3S$—; $C_2$-$C_8$alkyl interrupted by oxygen; cyclohexyl, $C_4$-$C_{10}$-alkenyl, phenyl,
$C_7$-$C_{10}$phenoxyalkyl, unsubstituted or $C_1$-$C_4$alkyl substituted $C_7$-$C_9$bicycloalkyl;

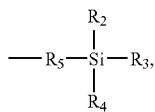

or when
$R_7$ is a direct bond, $R_1$ is —CN —$SOR_8$ or —$SO_2R_8$; when n is 2,
$R_1$ is $C_2$-$C_8$alkylene, $C_2$-$C_8$alkylene substituted with methyl; $C_2$-$C_{10}$alkylene substituted with methyl and interrupted by oxygen; $C_4$-$C_{12}$alkylene interrupted by oxygen or sulfur;

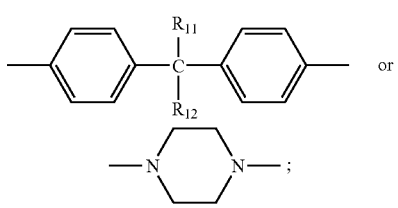

or when $R_6$ and $R_7$ are a direct bond, $R_1$ is

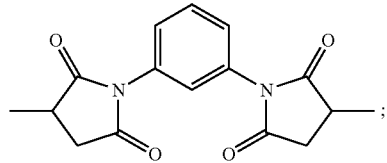

$R_2$, $R_3$ and $R_4$ are each independently of the others $C_1$-$C_4$alkyl, cyclohexyl, $C_2$-$C_6$alkenyl, benzyl, $C_1$-$C_4$alkoxy, cyclohexyloxy, $C_2$-$C_6$alkenyloxy, phenoxy, benzyloxy, chloro, $C_2$-$C_4$alkanoyloxy or benzoyloxy; with the proviso that at least one of $R_2$, $R_3$ or $R_4$ is $C_1$-$C_4$alkoxy, cyclohexyloxy,
$C_2$-$C_6$alkenyloxy, phenoxy, benzyloxy, chloro, $C_2$-$C_4$alkanoyloxy or benzoyloxy;
$R_5$ is $C_2$-$C_6$alkylene or cyclohexylene,
$R_6$ is a direct bond, $C_1$-$C_6$alkylene; or $C_1$-$C_6$alkylene substituted with methyl, $C_2$-$C_6$alkoxycarbonyl or phenyl;
$R_7$ is a direct bond or

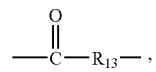

with the proviso that, when $R_7$ is a direct bond and n is 1, $R_6$ is not
a direct bond; and with the proviso that, when $R_7$ is

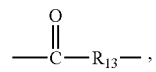

$R_6$ is not a direct bond;
$R_8$ is $C_1$-$C_8$alkyl or $C_2$-$C_{12}$alkenyl,
$R_{11}$ and $R_{12}$ are each independently of the other hydrogen or $C_1$-$C_6$alkyl,
$R_{13}$ is oxygen or —$N(R_{14})$—,
$R_{14}$ is hydrogen or methyl,
M is sodium or potassium, and
n is 1 or 2.

7. A composition according to claim 1, wherein when n is 1,
$R_1$ is hydrogen, $C_1$-$C_{18}$alkyl, $C_1$-$C_4$alkyl substituted with furyl, morpholine, $C_1$-$C_4$dialkylamino, $C_1$-$C_4$trialkylammonium or $M^{+-}O_3S$—; $C_2$-$C_6$alkyl interrupted by oxygen; cyclohexyl, $C_4$-$C_{10}$alkenyl, phenyl;
$C_7$-$C_9$phenoxyalkyl, unsubstituted or $C_1$-$C_4$alkyl substituted $C_7$-$C_9$bicycloalkyl;

$$-R_5-\underset{\underset{R_4}{|}}{\overset{\overset{R_2}{|}}{Si}}-R_3,$$

or when
$R_7$ is a direct bond, $R_1$ is —CN;
when n is 2, $R_1$ is $C_2$-$C_6$alkylene, $C_2$-$C_4$alkylene substituted with methyl; $C_4$-$C_8$alkylene substituted with methyl and interrupted by oxygen; $C_4$-$C_8$alkylene interrupted by oxygen;

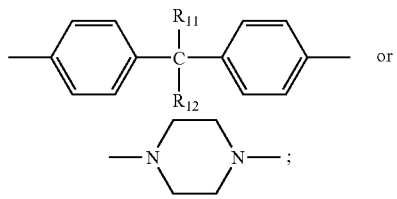 or or when $R_6$ and $R_7$ are a direct bond, $R_1$ is

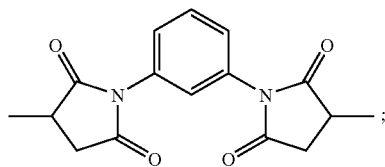;

$R_2$, $R_3$ and $R_4$ are each independently of the others $C_1$-$C_4$alkyl or $C_1$-$C_4$alkoxy; with the proviso that at least one of $R_2$, $R_3$ or $R_4$ is $C_1$-$C_4$alkoxy;
$R_5$ is $C_2$-$C_4$alkylene,
$R_6$ is a direct bond, $C_1$-$C_3$alkylene; or $C_1$-$C_3$alkylene substituted with methyl, $C_2$-$C_3$alkoxycarbonyl or phenyl;
$R_7$ is a direct bond or

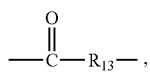, with the proviso that, when $R_7$ is a direct bond and n is 1, $R_6$ is not
a direct bond; and with the proviso that, when $R_7$ is

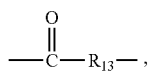, $R_6$ is not a direct bond;
$R_{11}$ and $R_{12}$ are each independently of the other hydrogen or $C_1$-$C_4$alkyl,
$R_{13}$ is oxygen or —N($R_{14}$)—,
$R_{14}$ is hydrogen,
M is potassium, and
n is 1 or 2;
or an oligomeric hydrolysis product of the compound of the formula I.

8. A composition according to claim 1, in which component a) is a natural or synthetic rubber or vulcanizate prepared therefrom.

9. A composition according to claim 1, in which component a) is a polydiene vulcanizate, a halogen-containing polydiene vulcanizate, a polydiene copolymer vulcanizate or an ethylene-propylene terpolymer vulcanizate.

10. A composition according to claim 1, wherein component (b) is silica or alumina, or a mixture of silica and alumina.

11. A composition according to claim 1, wherein component (b) is present in an amount of 1 to 40% based on the weight of component (a).

12. A composition according to claim 1, wherein component (c) is present in an amount of 0.01 to 10% based on the weight of component (a).

13. A composition according to claim 1, comprising in addition, besides components (a) and (b), further additives.

14. A composition according to claim 13, comprising as further additives, one or more components selected from the group consisting of pigments, dyes, levelling assistants, dispersants, plasticizers, vulcanization activators, vulcanization accelerators, vulcanizers, charge control agents, adhesion promoters, antioxidants and light stabilizers.

15. A composition according to claim 13, comprising, as further additives, phenolic antioxidants, aminic antioxidants, organic phosphites or phosphonites and/or thio-synergists.

16. A compound of the formula Ia

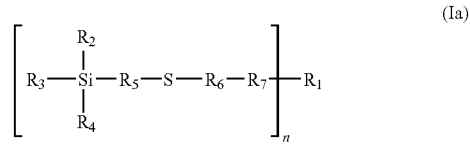 (Ia)

wherein, when n is 1,
$R_1$ is hydrogen, $C_1$-$C_{25}$alkyl, $C_1$-$C_{25}$alkyl substituted with furyl, morpholine, $C_1$-$C_4$dialkylamino, $C_1$-$C_4$trialkylammonium or $M^{+-}O_3S$—; $C_2$-$C_{25}$alkyl interrupted by oxygen; $C_5$-$C_{12}$cycloalkyl, $C_2$-$C_{25}$alkenyl, unsubstituted or $C_1$-$C_4$alkyl-substituted phenyl; $C_7$-$C_{12}$phenoxyalkyl, unsubstituted or $C_1$-$C_4$alkyl
substituted $C_7$-$C_9$bicycloalkyl;

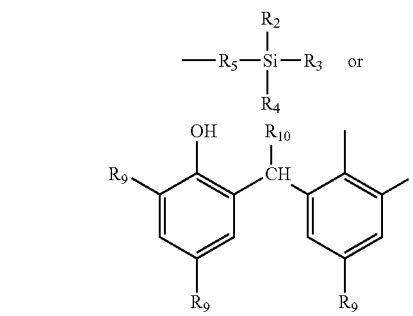

when n is 2,
$R_1$ is $C_1$-$C_{25}$alkylene, $C_1$-$C_{25}$alkylene substituted with $C_1$-$C_4$alkyl; $C_2$-$C_{25}$alkylene substituted with $C_1$-$C_4$alkyl and interrupted by oxygen; $C_2$-$C_{25}$alkylene interrupted by oxygen, sulfur, phenylene or cyclohexylene;

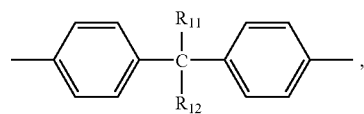, or

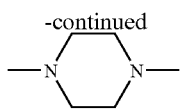

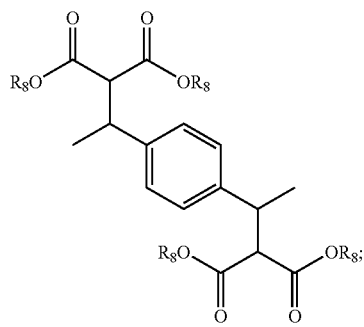

or
when R$_6$ and R$_7$ are a direct bond, R$_1$ is

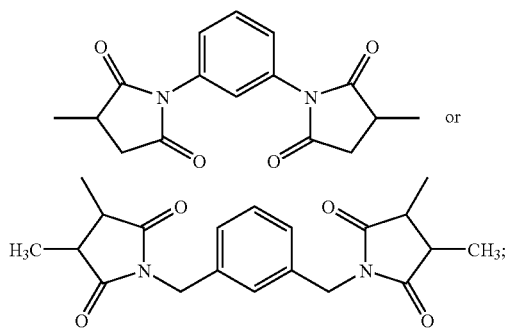

R$_2$, R$_3$ and R$_4$ are each independently of the others C$_1$-C$_{25}$alkyl, C$_2$-C$_{25}$alkyl interrupted by oxygen; C$_5$-C$_{12}$cycloalkyl, C$_2$-C$_{25}$alkenyl, unsubstituted or C$_1$-C$_4$alkyl-substituted phenyl, C$_7$-C$_9$phenylalkyl, C$_1$-C$_{25}$alkoxy, C$_3$-C$_{25}$alkoxy interrupted by oxygen; C$_5$-C$_{12}$cycloalkoxy, C$_2$-C$_{25}$alkenyloxy, unsubstituted or C$_1$-C$_4$alkyl-substituted phenoxy, C$_7$-C$_9$phenylalkoxy, halogen, C$_2$-C$_{25}$alkanoyloxy or unsubstituted or C$_1$-C$_4$alkyl substituted benzoyloxy; with the proviso that at least one of R$_2$, R$_3$ or R$_4$ is C$_1$-C$_{25}$alkoxy, C$_3$-C$_{25}$alkoxy interrupted by oxygen; C$_5$-C$_{12}$cycloalkoxy, C$_2$-C$_{25}$alkenyloxy, unsubstituted or C$_1$-C$_4$alkyl substituted phenoxy, C$_7$-C$_9$phenylalkoxy, halogen, C$_2$-C$_{25}$alkanoyloxy or unsubstituted or C$_1$-C$_4$alkyl substituted benzoyloxy;

R$_5$ is C$_1$-C$_{25}$alkylene, C$_5$-C$_{12}$cycloalkylene, unsubstituted or C$_1$-C$_4$alkyl substituted phenylene; R$_6$ is a direct bond, C$_1$-C$_{25}$alkylene; or C$_1$-C$_{25}$alkylene substituted with C$_1$-C$_{25}$alkyl, C$_2$-C$_{25}$alkoxycarbonyl or phenyl;

R$_7$ is a direct bond or

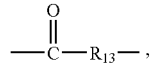

with the proviso that, when R$_7$ is a direct bond and n is 1, R$_6$ is not
a direct bond; and with the proviso that, when R$_7$ is

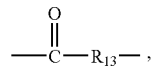

R$_6$ is not a direct bond;

R$_8$ is C$_1$-C$_{25}$alkyl, C$_2$-C$_{25}$alkyl interrupted by oxygen; C$_5$-C$_{12}$cycloalkyl, C$_2$-C$_{25}$alkenyl, C$_2$-C$_{25}$alkinyl, C$_7$-C$_9$phenylalkyl, unsubstituted or C$_1$-C$_4$alkyl-substituted phenyl, R$_9$ is C$_1$-C$_5$alkyl, R$_{10}$ is hydrogen or C$_1$-C$_4$alkyl, R$_{11}$ and R$_{12}$ are each independently of the other hydrogen, CF$_3$, C$_1$-C$_{12}$alkyl or phenyl, or R$_{11}$ and R$_{12}$, together with the carbon atom to which they are bonded, form a C$_5$-C$_8$-cycloalkylidene ring that is unsubstituted or substituted by from 1 to 3 C$_1$-C$_4$alkyl groups, R$_{13}$ is oxygen or —N(R$_{14}$)—, R$_{14}$ is hydrogen or C$_1$-C$_{12}$alkyl, M is sodium, potassium or ammonium, and n is 1 or 2;

or an oligomeric hydrolysis product of the compound of the formula Ia.

17. A compound according to claim 16, wherein when n is 1,

R$_1$ is hydrogen, C$_1$-C$_{18}$alkyl, C$_1$-C$_4$alkyl substituted with furyl, morpholine, C$_1$-C$_4$dialkylamino, C$_1$-C$_4$trialkylammonium or M$^{+-}$O$_3$S—; C$_2$-C$_6$alkyl interrupted by oxygen; cyclohexyl, C$_4$-C$_{10}$alkenyl, phenyl;

C$_7$-C$_9$phenoxyalkyl, unsubstituted or C$_1$-C$_4$alkyl substituted C$_7$-C$_9$bicycloalkyl; or

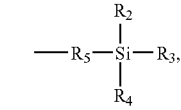

when n is 2,

R$_1$ is C$_2$-C$_6$alkylene, C$_2$-C$_4$alkylene substituted with methyl; C$_4$-C$_8$alkylene substituted with methyl and interrupted by oxygen; C$_4$-C$_8$alkylene interrupted by oxygen;

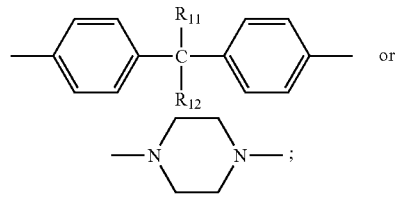

R$_2$, R$_3$ and R$_4$ are each independently of the others C$_1$-C$_4$alkyl or C$_1$-C$_4$alkoxy; with the proviso that at least one of R$_2$, R$_3$ or R$_4$ is C$_1$-C$_4$alkoxy;

R$_5$ C$_2$-C$_4$alkylene,

R$_6$ is C$_1$-C$_3$alkylene; or C$_1$-C$_3$alkylene substituted with methyl, C$_2$-C$_3$alkoxycarbonyl or phenyl;

$R_7$ is

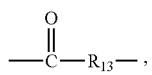

$R_{11}$ and $R_{12}$ are each independently of the other hydrogen or $C_1$-$C_4$alkyl, $R_{13}$ is oxygen or —N($R_{14}$)—, $R_{14}$ is hydrogen, M is potassium, and n is 1 or 2; or an oligomeric hydrolysis product of the compound of the formula Ia.

18. A process for ensuring the coupling of a white reinforcing filler to an elastomer reinforced by a white filler, which process comprises vulcanizing a composition according to claim 1.

* * * * *